(12) United States Patent
Phillips et al.

(10) Patent No.: US 9,953,478 B2
(45) Date of Patent: Apr. 24, 2018

(54) UTILIZATION OF WORK ORDER DATA IN AN AUTOMATED TOOL CONTROL SYSTEM

(71) Applicant: SNAP-ON INCORPORATED, Kenosha, WI (US)

(72) Inventors: Preston Phillips, Conway, AR (US); David C. Fly, Maumelle, AR (US); Matthew J. Lipsey, Sherwood, AR (US); Joseph Chwan, Jr., Mechanicsburg, PA (US); Frederick J. Rogers, N. Little Rock, AR (US)

(73) Assignee: SNAP-ON INCORPORATED, Kenosha, WI (US)

( * ) Notice: Subject to any disclaimer, the term of this patent is extended or adjusted under 35 U.S.C. 154(b) by 676 days.

(21) Appl. No.: 13/916,351

(22) Filed: Jun. 12, 2013

(65) Prior Publication Data

US 2013/0346261 A1  Dec. 26, 2013

Related U.S. Application Data

(60) Provisional application No. 61/658,729, filed on Jun. 12, 2012.

(51) Int. Cl.
*G07C 9/00* (2006.01)
*G06K 9/00* (2006.01)
(Continued)

(52) U.S. Cl.
CPC .......... *G07C 9/00912* (2013.01); *B25H 3/00* (2013.01); *B25H 3/028* (2013.01); *G06F 3/0486* (2013.01);
(Continued)

(58) Field of Classification Search
CPC ...... G07C 9/00912; B25H 3/00; B25H 3/028; G06F 3/0486
(Continued)

(56) References Cited

U.S. PATENT DOCUMENTS 5,205,436 A * 4/1993 Savage .................... A47F 3/02
                                                              221/1
5,591,956 A    1/1997 Longacre, Jr. et al.
(Continued)

FOREIGN PATENT DOCUMENTS

CN       201291451 Y      8/2009
CN       102177524 A      9/2011
(Continued)

OTHER PUBLICATIONS

International Search Report issued in Application No. PCT/US2013/045492 dated Jan. 14, 2014.
(Continued)

*Primary Examiner* — Vanel Frenel
(74) *Attorney, Agent, or Firm* — McDermott Will & Emery LLP

(57) ABSTRACT

An inventory control system is provided for monitoring the removal and replacement of objects stored in the system. The system includes a storage container including a plurality of storage locations for storing objects; a sensing device configured to detect the presence or absence of objects in the storage locations; a display device; and a data processor. The data processor is configured to receive work order data identifying a particular work order; receive information associated with the work order based on the work order data; and display the information associated with the work order on the display device.

23 Claims, 23 Drawing Sheets

(51) Int. Cl.
*G06F 3/0486* (2013.01)
*G06Q 10/08* (2012.01)
*B25H 3/00* (2006.01)
*B25H 3/02* (2006.01)

(52) U.S. Cl.
CPC ....... *G06K 9/00771* (2013.01); *G06Q 10/087* (2013.01); *G07C 9/00031* (2013.01); *G07C 9/00039* (2013.01); *G07C 9/00111* (2013.01); *G07C 9/00896* (2013.01)

(58) Field of Classification Search
USPC ........ 705/28, 22; 340/3.1, 5.1, 5.2; 700/236; 235/385; 382/103, 218
See application file for complete search history.

(56) References Cited

U.S. PATENT DOCUMENTS

| | | | |
|---|---|---|---|
| 5,725,096 A * | 3/1998 | Winnard | B25H 3/06 206/350 |
| 6,568,593 B2 | 5/2003 | Hetzer | |
| 6,707,381 B1 | 3/2004 | Maloney | |
| 6,744,436 B1 | 6/2004 | Chirieleison, Jr. et al. | |
| 6,840,451 B2 * | 1/2005 | Allen | G06Q 10/06 235/462.09 |
| 6,989,749 B2 | 1/2006 | Mohr | |
| 7,109,864 B2 * | 9/2006 | Maloney | G06K 7/10079 340/568.1 |
| 7,336,174 B1 * | 2/2008 | Maloney | G08B 13/1427 340/568.1 |
| 7,743,391 B2 | 6/2010 | Balaji et al. | |
| 7,942,321 B2 * | 5/2011 | Linton et al. | 235/385 |
| 7,956,847 B2 | 6/2011 | Christie | |
| 8,036,939 B2 | 10/2011 | Gil et al. | |
| 2002/0143672 A1 * | 10/2002 | Sawasaki | G06Q 10/0875 705/29 |
| 2003/0095710 A1 * | 5/2003 | Tessadro | G06T 7/12 382/199 |
| 2003/0102970 A1 * | 6/2003 | Creel | G06K 17/00 340/568.1 |
| 2004/0046020 A1 | 3/2004 | Andreasson et al. | |
| 2007/0023193 A1 * | 2/2007 | King | B25H 3/028 166/387 |
| 2007/0177045 A1 * | 8/2007 | Karasawa | H04N 5/2254 348/333.01 |
| 2007/0188615 A1 | 8/2007 | Beniyama et al. | |
| 2007/0237369 A1 * | 10/2007 | Brunner | A61B 6/032 382/128 |
| 2008/0059338 A1 | 3/2008 | Hubbard | |
| 2008/0117053 A1 * | 5/2008 | Maloney | 340/572.4 |
| 2008/0303904 A1 | 12/2008 | Hsieh | |
| 2009/0060349 A1 * | 3/2009 | Linaker | G06K 9/00664 382/209 |
| 2009/0063306 A1 * | 3/2009 | Fano et al. | 705/28 |
| 2009/0072029 A1 | 3/2009 | Martin | |
| 2009/0109004 A1 * | 4/2009 | Van Alstyne | 340/10.1 |
| 2009/0208198 A1 | 8/2009 | Khuntia | |
| 2010/0039513 A1 | 2/2010 | Glickman et al. | |
| 2010/0045423 A1 * | 2/2010 | Glickman | G06Q 10/087 340/5.1 |
| 2010/0046791 A1 | 2/2010 | Glickman et al. | |
| 2010/0111411 A1 * | 5/2010 | Ernst | G06F 17/3028 382/166 |
| 2010/0179890 A1 | 7/2010 | Cianciotto, Jr. et al. | |
| 2010/0205044 A1 | 8/2010 | Scheer | |
| 2010/0252626 A1 | 10/2010 | Elizondo et al. | |
| 2010/0312859 A1 | 12/2010 | Lev et al. | |
| 2011/0025503 A1 * | 2/2011 | Weaver | G08B 21/24 340/572.1 |
| 2011/0121699 A1 | 5/2011 | Freimuth | |
| 2011/0153614 A1 | 6/2011 | Solomon | |
| 2012/0271742 A1 * | 10/2012 | Solomon | 705/28 |
| 2012/0327202 A1 * | 12/2012 | Nagamachi | G07G 1/145 348/61 |

FOREIGN PATENT DOCUMENTS

| | | |
|---|---|---|
| EP | 1808275 A2 | 7/2007 |
| GB | 2453977 A | 4/2009 |
| WO | 2008/029159 A1 | 3/2008 |
| WO | 2009053703 A2 | 4/2009 |
| WO | 2010017531 A2 | 2/2010 |

OTHER PUBLICATIONS

International Search Report and Written Opinion issued in International Application No. PCT/US2013/045469 dated Jun. 4, 2014.
International Search Report issued in International Application No. PCT/US2013/045472 dated Nov. 8, 2013.
Transmittal of the International Search Report and Written Opinion issued in PCT/US2013/045472 dated Nov. 8, 2013.
International Search Report issued in Application No. PCT/US2013/45489 dated Feb. 21, 2014.
U.S. Office Action issued in U.S. Appl. No. 13/916,245 dated Oct. 23, 2014.
International Preliminary Report on Patentability issued in International Application No. PCT/US2013/045489, dated Dec. 24, 2014.
International Preliminary Report on Patentability issued in International Application No. PCT/US2013/045472, dated Dec. 24, 2014.
International Preliminary Report on Patentability issued in International Application No. PCT/US2013/045492, dated Dec. 24, 2014.
International Preliminary Report on Patentability issued in International Application No. PCT/US2013/045469, dated Dec. 24, 2014.
Final U.S. Office Action dated May 6, 2015 issued in corresponding U.S. Appl. No. 13/916,245.
Chinese Office Action dated Jul. 27, 2015 issued in Chinese Patent Application No. 201380039245.9 (English translation).
U.S. Office Action dated Sep. 25, 2015 issued in U.S. Appl. No. 13/916,192.
U.S. Office Action dated Jun. 29, 2015 issued in U.S. Appl. No. 13/916,374.
U.S. Office Action dated Feb. 25, 2016, issued in related U.S. Appl. No. 13/916,245.
U.S. Office Action dated Jan. 29, 2016, issued in related U.S. Appl. No. 13/916,374.
Extended European Search Report dated Mar. 23, 2016, issued in European Application No. 13805090.1.
Extended European Search Report dated Apr. 1, 2016, issued in European Application No. 13804853.3.
Extended European Search Report dated Mar. 24, 2016, issued in European Application No. 15002055.0.
Non-Final Office Action dated Nov. 18, 2016, issued in U.S. Appl. No. 13/916,192.
Non-Final Office Action dated Dec. 2, 2016, issued in U.S. Appl. No. 14/954,378.
First Chinese Office Action dated Dec. 2, 2016, issued in Chinese patent Application No. 201380039633.7. (w/ English translation).
Third Chinese Office Action dated Sep. 13, 2016, issued in Chinese Patent Application No. 201380039245.9. (w/ English translation).
Final Office Action dated Aug. 31, 2016, issued in U.S. Appl. No. 13/916,245.
Final Office Action dated Jul. 14, 2016, issued in corresponding U.S. Appl. No. 13/916,192.
Non-Final Office Action dated Aug. 25, 2016, issued in U.S. Appl. No. 13/916,374.
Final Office Action dated Feb. 23, 2017, issued in U.S. Appl. No. 13/916,374.
Non-Final Office Action dated Apr. 14, 2017, issued in U.S. Appl. No. 14/954,378.
Restriction Requirement dated May 9, 2017, issued in U.S. Appl. No. 13/916,374.
First Chinese Office Action dated Mar. 10, 2017, issued in Chinese Patent Application No. 201380039710.9. (w/ English translation).
The Extended European Search Report dated Apr. 1, 2016, issued in European Application No. 13804853.3.
Chinese Office Action dated Mar. 8, 2016, issued in Chinese Application No. 201380039245.9. (w/ English translation).

(56) References Cited

OTHER PUBLICATIONS

The Extended European Search Report dated Mar. 31, 2016, issued in European Application No. 13803597.7.
The Extended European Search Report dated Apr. 6, 2016, issued in European Application No. 13860269.3.
Second Chinese Office Action issued in Chinese Patent Application No. 201380039633.7, dated Aug. 2, 2017 (With English Translation).
Notice of Allowance issued in U.S. Appl. No. 13/916,351, dated Sep. 18, 2017.
Non-Final Office Action issued in U.S. Appl. No. 14/954,378, dated Sep. 20, 2017.
Final Office Action issued in U.S. Appl. No. 14/954,378, dated Aug. 17, 2017.
Non-Final Office Action issued in U.S. Appl. No. 13/916,374, dated Aug. 16, 2017.

* cited by examiner

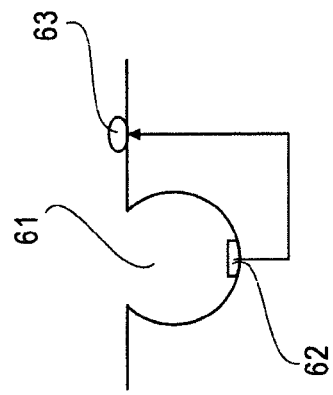
FIG. 5B
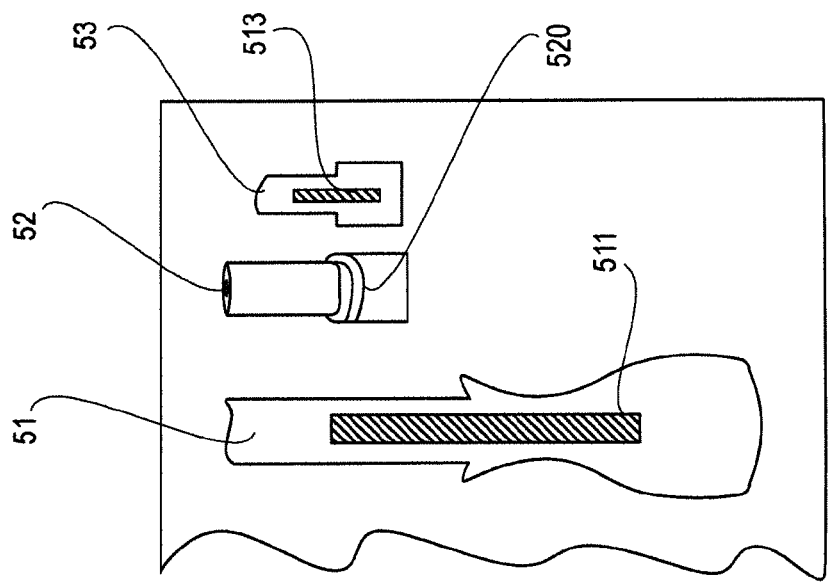
FIG. 5A
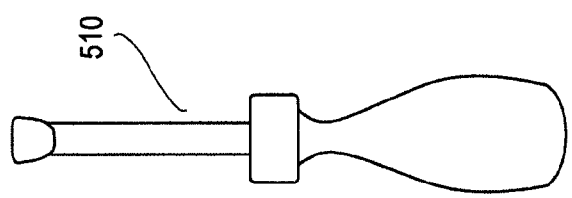

AUDIT TRACK

Audit Trail — 910

| Date / Time | Employee Name |
|---|---|
| 7/31/2008 5:31:12 PM | Andy Mechanic |
| 7/31/2008 3:38:04 PM | Mike Gill |
| 7/31/2008 10:49:04 AM | David Jackson |
| 7/31/2008 9:14:04 AM | Joe Chwan |
| 7/31/2008 8:40:04 AM | Andy Mechanic |
| 7/30/2008 6:37:04 PM | David Jackson |
| 7/30/2008 1:59:04 PM | David Jackson |
| 7/30/2008 11:02:12 AM | Mike Gill |
| 7/30/2008 10:01:43 AM | Joe Chwan |
| 7/30/2008 9:45:24 AM | Mike Gill |
| 7/30/2008 9:28:16 AM | David Jackson |
| 7/30/2008 8:54:27 AM | Joe Chwan |
| 7/30/2008 7:31:18 AM | David Jackson |

UTILIZATION OF WORK ORDER DATA IN AN AUTOMATED TOOL CONTROL SYSTEM

RELATED APPLICATION

The present invention claims priority of provisional patent application No. 61/658,729, filed Jun. 12, 2012, the contents of which are incorporated herein in their entirety.

TECHNICAL FIELD

The present subject matter relates to features and functions of an electronic inventory control system, in particular an image-based inventory control system, which monitors the removal and replacement of objects, and identifying objects removed and returned to the system.

BACKGROUND

When tools are used in a manufacturing or service environment, it is important that tools be returned to a storage unit, such as a tool box, after use. Employers typically perform a manual inventory check of the tool box to minimize or eliminate the problem of misplacement or theft of expensive tools. Companies can conduct random audits of employee's toolbox to prevent theft and monitor tool location.

Some industries have high standards for inventory control of tools, for preventing incidents of leaving tools in the workplace environment where they could cause severe damage. For the aerospace industry, it is important to ensure that no tools are accidentally left behind in an aircraft or missile being manufactured, assembled or repaired. The Aerospace Industries Association even establishes a standard called National Aerospace Standard including recommended procedures, personnel management and operations to reduce foreign object damage (FOD) to aerospace products. FOD is defined as any object not structurally part of the aircraft. The most common foreign objects found are nuts, bolts, safety wire, and hand tools. Inventory control over tools is critical to prevent tools from being left in an aircraft.

Some toolboxes include built-in inventory determination features to track inventory conditions of tools stored in those toolboxes. For example, some toolboxes dispose contact sensors, magnetic sensors or infrared sensors in or next to each tool storage locations, to detect whether a tool is placed in each tool storage location. Based on signals generated by the sensors, the toolboxes are able to determine whether any tools are missing. While this type of inventory check may be useful to some extent, it suffers from various drawbacks. For instance, if a sensor detects that something is occupying a storage location, the toolbox will determine that no tool is missing from that storage location. However, the toolbox does not know whether the right kind of tool is indeed placed back in the toolbox or it is just some objects placed in the storage location to cheat the system. Furthermore, disposing sensors for numerous storage locations in a toolbox is tedious and costly, and the large number of sensors is prone to damages or malfunctions which will produce false negative or positive alarms.

Accordingly, there is a need for an effective inventory control system to assist tracking and accounting for usage of tools, and whether they are properly put back after usage. To address these issues, automated tool control systems have been developed which determine an inventory condition of objects by capturing and processing images of storage locations that are used to store the objects. Such an exemplary tool storage system is described in U.S. patent application Ser. No. 12/484,127, filed Jun. 12, 2009, the entire disclosure of which is hereby incorporated by reference in its entirety.

Many industries publish a written work order to describe the work to be done, the location of the work, etc. Such work orders reference other work-related documents as well. However, typical tool control systems disadvantageously do not link to the information the work order identifies.

In any automated tool control system, verifications of tools contained in kits (e.g., tap and die sets, drill bit sets) is problematic. There is a need to accurately verify that the contents of kits is accounted for after the completion of a job.

Inventory in a tool storage device must periodically be audited. A problem in current tool control environments is that there is no automated centralized control over the lock state of tool storage devices. An individual or group of individuals must inspect each tool storage device during an audit to insure they are locked, all inventory is accounted for, and that they remain locked until the work object (e.g., an aircraft) is certified to leave the area and the tool storage devices are released for use. This is an inefficient method of ensuring all tools or stored objects are accounted for.

It is desirable to limit access to an automated tool control system to authorized personnel to interact with the system inventory. Current automated tool control systems use a single method for user authentication before granting access to tools stored in the system, which is not sufficient for high-security applications. There exists a need for improved security for user access to tool control systems.

Automated tool control systems store event data and call up that data for review. Such log event data may include employee name, employee number, date, time, action, tool name, tool number, box name, box ID, drawer or tray, parent location, child location, and other pertinent data fields known to those of skill in the art. Simple, or naïve, manual filtering provides only basic logic for field choices, and limits the events contained in the log files or audit images to be displayed to the user. Disadvantageously, not all relevant events can be displayed using manually selected field choices. There exists a need for more sophisticated filtering of audit images in tool control systems.

SUMMARY

The teachings herein improve over conventional tool control systems by providing improved systems and methods for auditing and forensics.

According to the present disclosure, the foregoing and other advantages are achieved in part by an inventory control system for monitoring the removal and replacement of objects stored in the system, the system comprising a storage container including a plurality of storage locations for storing objects; a sensing device configured to detect the presence or absence of objects in the storage locations; a display device; and a data processor. The data processor is configured to receive work order data identifying a particular work order; receive information associated with the work order based on the work order data; and display the information associated with the work order on the display device.

According to another aspect of the disclosure, an inventory control system for monitoring the removal and replacement of objects stored in the system comprises a storage container including a plurality of storage locations for storing objects, wherein the objects include a kit having a plurality of sub-components; a sensing device configured to detect the presence or absence of the objects in the storage locations; a display device; and a data processor. The data processor is configured to receive information relating to the kit and the sub-components, including at least one of a listing of the sub-components and an image of the kit, and display the information relating to the kit and the sub-components on the display device when the sensing device detects the presence of the kit at one of the storage locations after it has detected the absence of the kit at the one of the storage locations.

According to a further aspect of the disclosure, an inventory control system for monitoring the removal and replacement of objects stored in the system comprises a storage device including a container having a plurality of storage locations for storing objects, a sensing device configured to detect the presence or absence of objects in the storage locations, a locking mechanism for preventing access to the storage locations, a data processor operatively connected to the locking mechanism and the sensing device; and an administrative computer. The administrative computer is remote from the storage device and operatively connected to the data processor, and is configured to provide commands to the data processor to remotely control the storage device locking mechanism.

According to yet another aspect of the disclosure, an inventory control system for monitoring the removal and replacement of objects stored in the system comprises a storage container including a plurality of storage locations for storing objects; a sensing device configured to detect the presence or absence of objects in the storage locations; and a data processor. The data processor is configured to receive information representing user access rights and to allow or deny access by the user to the tool storage device based on the user's access rights; and is further configured to require that the information representing user access rights includes at least two types of user authentication to allow access to the tool storage device.

According to a further aspect of the disclosure, an inventory control system for monitoring the removal and replacement of objects stored in the system comprises a plurality of storage containers, each including a plurality of storage locations for storing objects; an image sensing device configured to capture image data of the containers, including image data of the plurality of storage locations; a display device; and a data processor. The data processor is configured to receive information representing captured images of the storage locations and data representing the usage of the objects associated with the images; display on the display device audit images of the storage container; and apply a filtering technique to display the audit images according to user definable usage data fields associated with the audit images. The filtering technique is for selecting audit images associated with one event out of a plurality of events occurring in the system. The filtering technique comprises filtering out any object-specific events for objects other than an object of interest, and filtering out any container-specific events for containers other than a container of interest.

According to another aspect of the disclosure, an inventory control system for monitoring the removal and replacement of objects stored in the system comprises a storage container including a plurality of storage locations for storing objects; an image sensing device configured to capture image data of the container, including image data of the plurality of storage locations; a display device; and a data processor. The data processor is configured to receive information representing images of the storage locations, display a plurality of images of the storage locations simultaneously on the display, and link the plurality of images to allow simultaneous zoom and pan of the images.

Additional advantages and novel features will be set forth in part in the description which follows and in part will become apparent to those having ordinary skill in the art upon examination of the following and the accompanying drawings or may be learned from production or operation of the examples. The advantages of the present teachings may be realized and attained by practice or use of the methodologies, instrumentalities and combinations particularly pointed out in the appended claims.

BRIEF DESCRIPTION OF THE DRAWINGS

Reference is made to the attached drawings, wherein elements having the same reference numeral designations represent like elements throughout, and wherein:

FIGS. 5A and 5B are exemplary identifier designs for use in this disclosure;

FIGS. 9A-9D are illustrative images of an exemplary audit record and images taken during access to an exemplary system according to this disclosure;

FIGS. 14 and 15 are illustrative images of an exemplary audit record and images taken during access to an exemplary system according to this disclosure

DETAILED DESCRIPTION

Figure 1A:
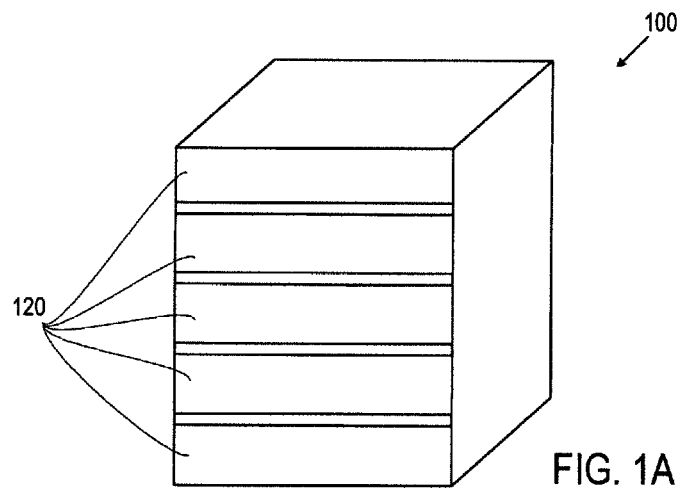
FIGS. 1a and 1b show exemplary storage units in which implementations according to this disclosure may be implemented.

In the following description, for the purposes of explanation, numerous specific details are set forth in order to provide a thorough understanding of the present disclosure. Specifically, operations of illustrative implementations that utilize machine vision to identify inventory conditions of a storage unit are described in the context of tool management and tool inventory control. It will be apparent, however, to one skilled in the art that concepts of the disclosure may be practiced or implemented without these specific details. Similar concepts may be utilized in other types of inventory control systems such as warehouse management, jewelry inventory management, sensitive or controlled substance management, mini bar inventory management, drug management, vault or security box management, etc. In other instances, well-known structures and devices are shown in block diagram form in order to avoid unnecessarily obscuring the present disclosure.

This disclosure describes features that enable an automated tool control storage system to be equipped with a device to read an identifying mark (bar code) on a work order, and associate it with stored data such as work location and required tool lists. The disclosed automated tool control storage device displays the stored data (e.g., work location, required tool lists, and other data) associated with the identifying mark on the work order.

Since one of the primary functions of automated tool control systems is to ensure that all tools are accounted for and that no work product leaves the work area with a tool in it when work is concluded, this disclosure provides the ability for an administrative application of a tool control system to "lock down" tool boxes until authorized auditors complete an audit of the contents. The capability to lock down selected boxes can be on a timed basis, as well as by authorized users. It can be preceded by a requirement to return all tools to the box prior to lock down. The administrator defines authorized auditors for each tool control storage device and the number of auditors required to complete an audit on each individual tool control tool storage device.

Also disclosed is a technique to display a list of the contents of a kit on the tool storage device screen, and to also display a photographic image of the kit. The photographic image can be provided by an imaging-equipped automated tool storage device or by a simple photograph downloaded from an external camera.

Also disclosed is multi-factor authentication to gain access to the tool storage device and administrative computer in an automated tool control system. This results in improved security. For example, a user is required to scan a badge containing security information which in turn triggers a display to enter a pin number on the tool storage device's touch screen. Once the multi-factor requirements are satisfied, the user is allowed access to the automated tool storage device.

This disclosure additionally describes, in an imaging equipped inventory control system, a feature for arranging "audit" images in the proper sequence automatically, thereby eliminating the need for the administrator to manually find and arrange the images and thereby save time and improve efficiency. Typically, complete images of the drawers or trays are created as each drawer or tray is opened and as each drawer or tray is closed. These audit images are available to the tool control system administrator. The administrator uses the images to conduct analysis of tool status by user and time stamp in cases where there are problems with the tool status. These problems may be wrong tool, lost tool, not my tool, broken tool, etc. Instead of the administrator calling the images up manually and using filter functions (to arrange by tool box, drawer or tray, user, tool, time, etc.), the present disclosure arranges the images in the proper sequence automatically.

In typical automated tool control systems that display the tool storage device layers in the drawer or tray opening and drawer or tray closing configurations, there is no ability to link pan and zoom features between the two related images for each drawer or tray cycle. The images must be panned and zoomed individually. This disclosure describes a way to link the pan and zoom features together for both images, so the region of interest to the viewer is the displayed to the user at all times.

With this overview, reference now is made in detail to the examples illustrated in the accompanying drawings and discussed below.

Overview of Exemplary Tool Storage Systems

Figure 1B:
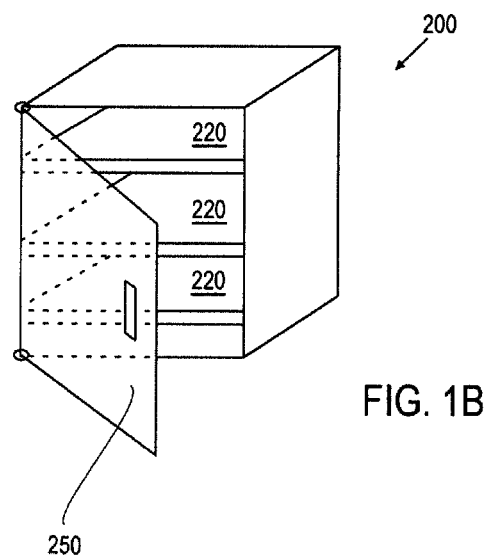

FIGS. 1a and 1b show exemplary storage units in which inventory control systems according to this disclosure may be implemented. FIG. 1a is an exemplary tool storage system 100 including multiple storage drawers 120. Each storage drawer 120 includes multiple storage locations for storing various types of tools. As used throughout this disclosure, a storage location is a location in a storage system for storing or securing objects. In one implementation, each tool has a specific pre-designated storage location in the tool storage system.

Each storage drawer operates between a close mode, which allows no access to the contents of the drawer, and an open mode, which allows partial or complete access to the contents of the drawer. When a storage drawer moves from a close mode to an open mode, the storage drawer allows increasing access to its contents. On the other hand, if a storage moves from an open mode to a close mode, the storage drawer allows decreasing access to its contents. As shown in FIG. 1a, all storage drawers 120 are in close mode.

A locking device may be used to control access to the contents of the drawers 120. Each individual drawer 120 may have its own lock or multiple storage drawers 120 may share a common locking device. Only authenticated or authorized users are able to access to the contents of the drawers.

The storage drawers may have different sizes, shapes, layouts and arrangements. FIG. 1b shows another type of tool storage system 200 which includes multiple storage shelves or compartments 220 and a single door 250 securing access to the storage shelves 250. The storage shelves or compartments may come in different sizes, shapes, layouts and arrangements.

Figure 2:
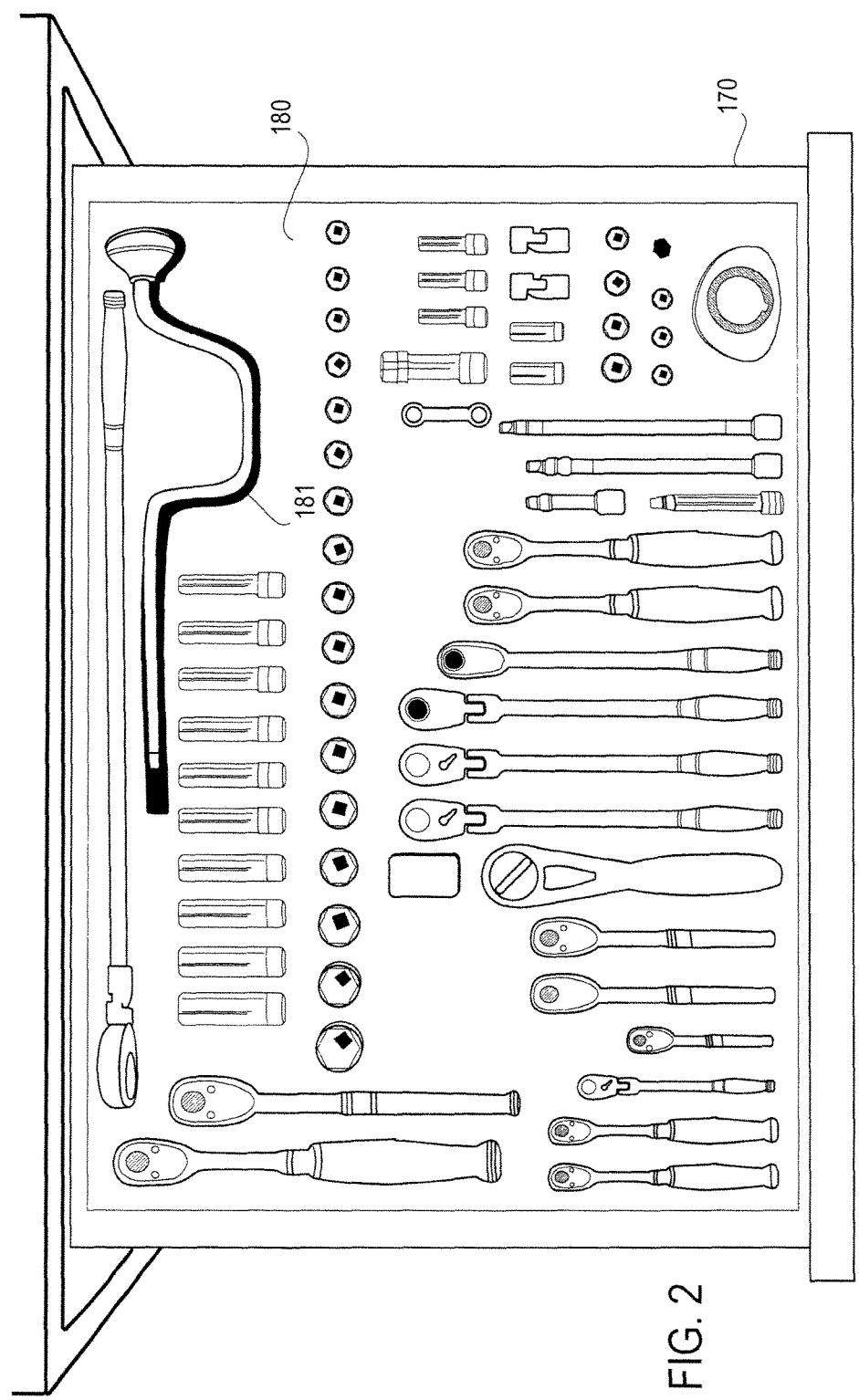
FIG. 2 shows details inside an exemplary storage drawer operated in the open mode.

FIG. 2 shows details inside an exemplary storage drawer 120 in the open mode. Each storage drawer 120 includes a foam base 180 having at least one storage location, such as cutouts 181, for storing tools. Each cutout is specifically contoured and shaped for fittingly receiving a tool with corresponding shapes. Tools may be secured in each storage location by using hooks, Velcro, latches, pressures from the foam, etc.

Figure 3:
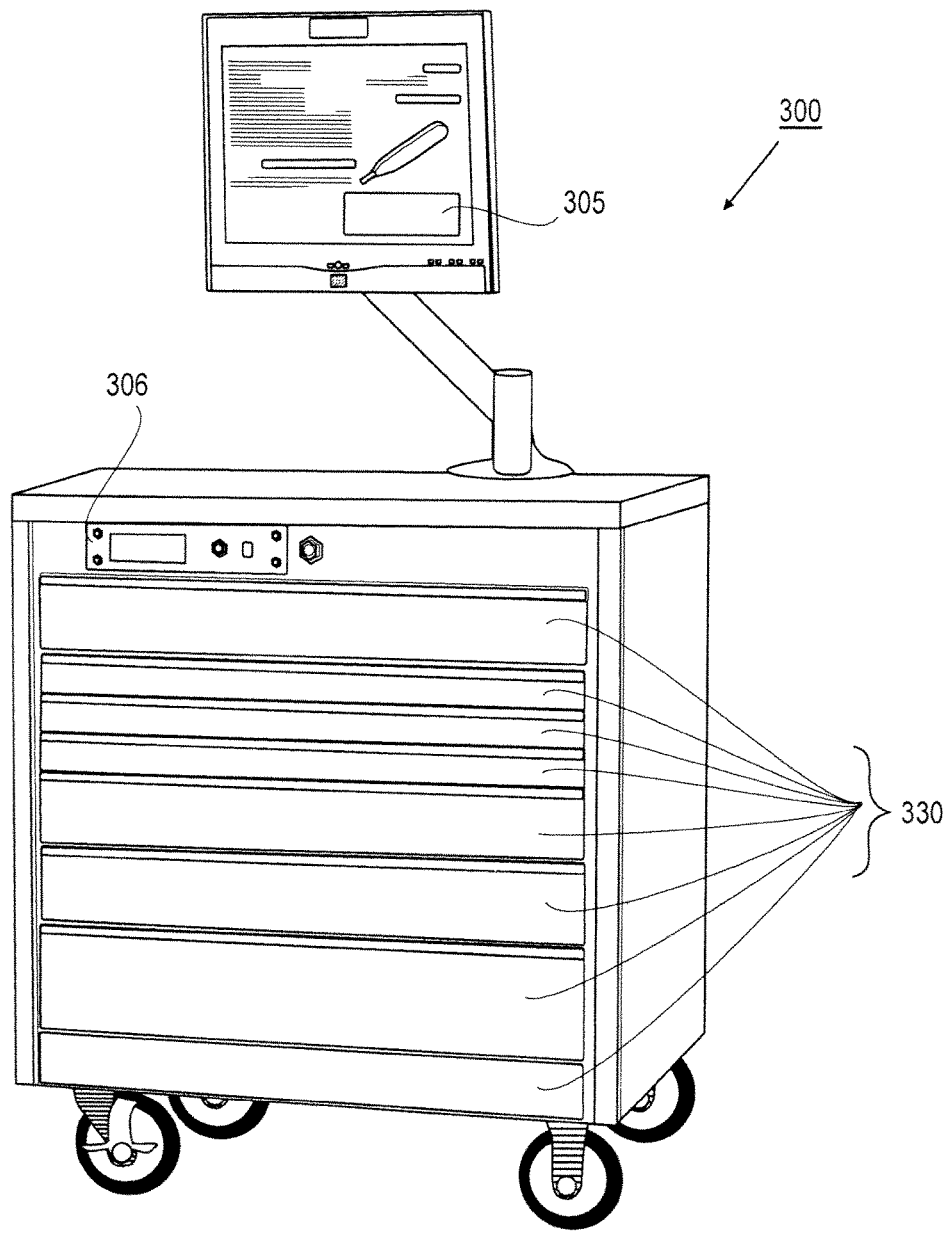
FIG. 3 shows an exemplary tool storage system according to this disclosure.

FIG. 3 shows an exemplary inventory control system implemented as a tool storage system 300 according to this disclosure for storing tools. Storage system 300 includes a display 305, an access control device 306, such as a card reader, for verifying identity and authorization levels of a user intending to access storage system 300, multiple tool storage drawers 330 for storing tools. Tool storage system 300 includes an image sensing device configured to capture images of contents or storage locations of the system. The image sensing device may be lens-based cameras, CCD cameras, CMOS cameras, video cameras, or any type of device that captures images. System 300 includes a data processing system, such as a computer, for processing images captured by the image sensing device. Images captured or formed by the image sensing device are processed by the data processing system for determining an inventory condition of the system or each storage drawer. The term inventory condition as used throughout this disclosure means information relating to an existence or non-existence condition of objects.

The data processing system may be part of tool storage system 300. In one implementation, the data processing system is a remote computer having a data link, such as a wired or wireless link, coupled to tool storage system 300; or a combination of a computer integrated in storage system 300 and a computer remote to storage system 300. Detailed operations for forming images and determining inventory conditions will be discussed shortly.

Drawers 330 are similar to those drawers 120 shown in FIG. 1a. Display 305 is an input and/or output device of storage system 330, configured to output information. Information entry via display 305 is possible such as by using a touch screen display. Access control device 306 is used to limit access to tool storage drawers 330 to authorized users only. Access control device 306, through the use of one or more locking devices, keeps all storage drawers 330 locked in a closed position until access control device 306 authenticates a user's authorization for accessing storage system 300. Access control device 306 may use one or more access authentication means to verify a user's authorization levels, such as by using a key pad to enter an access code, a keycard reader to read from a key card or fobs authorization level of a user holding the card or fob, biometric methods such as fingerprint readers or retinal scans, or other methods. If access control device 306 determines that a user is authorized to access storage system 300, it unlocks some or all storage drawers 330, depending on the user's authorization level, allowing the user to remove or replace tools. In one implementation, access to each storage drawer 300 is controlled and granted independently. Based on an assigned authorization or access level, a user may be granted access to one or more drawers of system 300, but not to other drawers. In one implementation, access control device 306 relocks a storage drawer 330 when or after a user closes the drawer.

The location of access control device 306 is not limited to the front of storage system 300. It could be disposed on the top of the system or on a side surface of the system. In one implementation, access control device 306 is integrated with display 305. User information for authentication purpose may be input through display device with touch screen functions, face detection cameras, fingerprint readers, retinal scanners or any other types of devices used for verifying a user's authorization to access storage system 300.

Figure 4A:
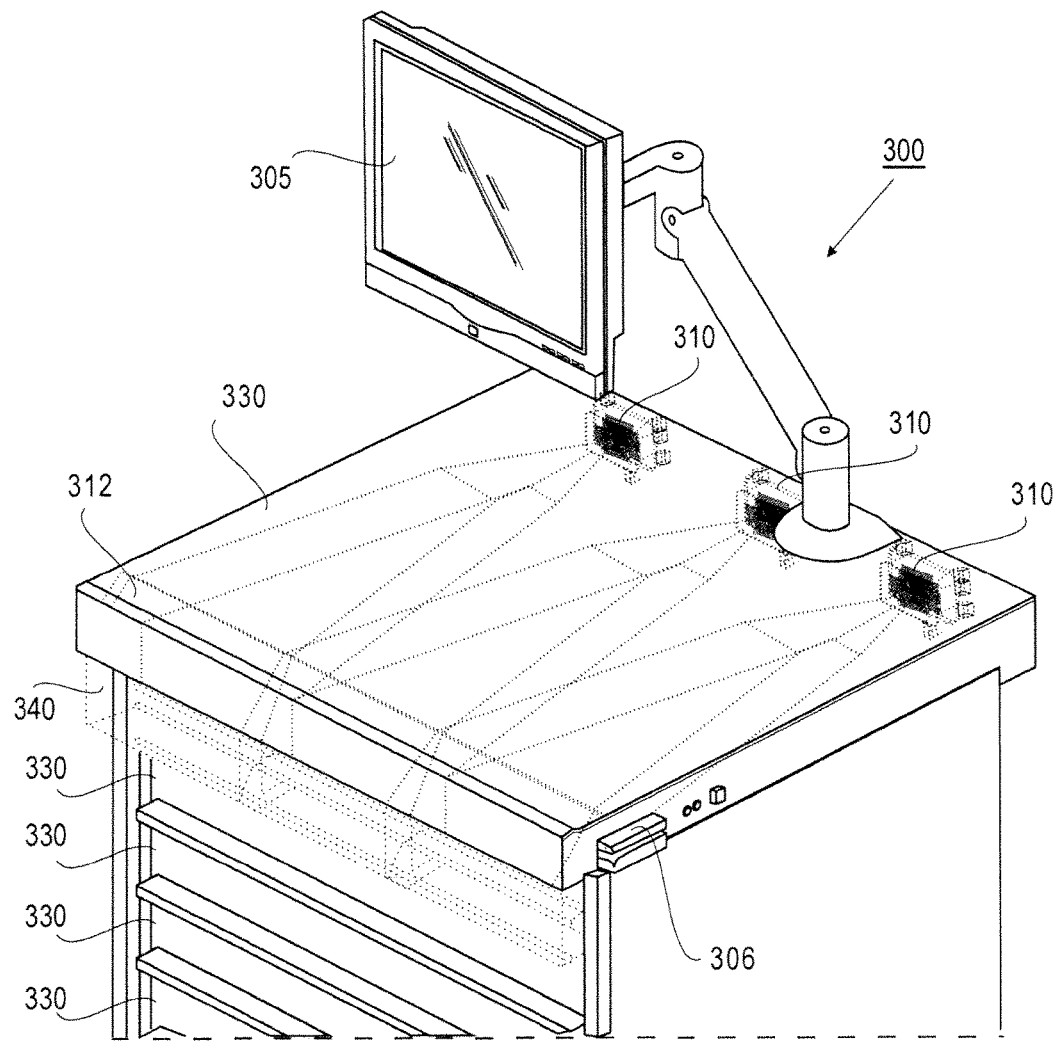
FIGS. 4A-4C and 4E are different views of the tool storage system shown in FIG. 3.
Figure 4B:
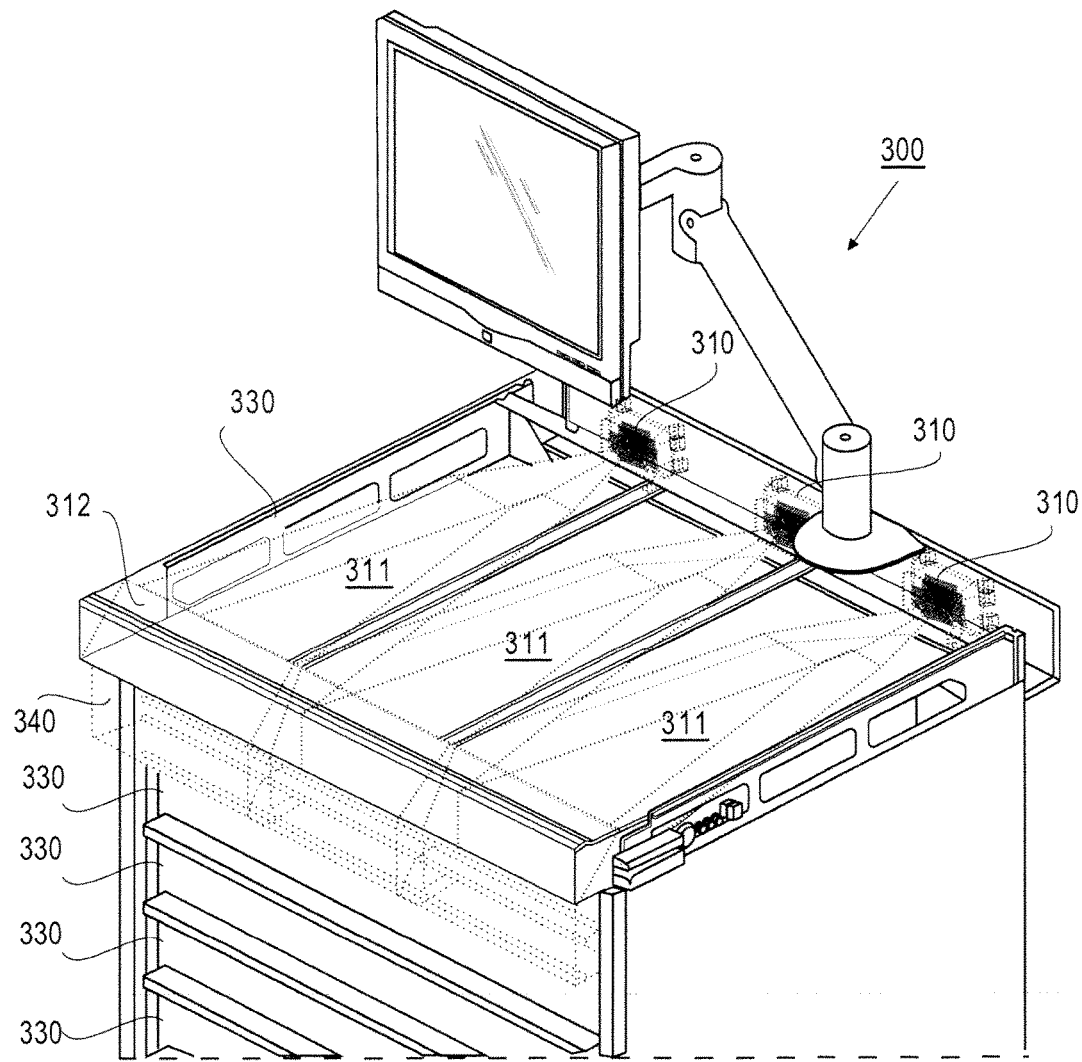

FIGS. 4a and 4b show a partial perspective view of tool storage system 300. As illustrated in FIG. 4a, an access control device 306 in the form of a card reader is disposed on a side surface of the system. Storage system 300 includes an imaging compartment 330 which houses an image sensing device comprising three cameras 310 and a light directing device, such as a mirror 312 having a reflection surface disposed at about 45 degrees downwardly relative to a vertical surface, for directing light reflected from drawers 330 to cameras 310. The directed light, after arriving to cameras 310, allow cameras 310 to form images of drawers 330. The shaded area 340 below mirror 312 represents a viewing field of the imaging sensing device of tool storage system 300. Mirror 312 has a width equal to or larger than that of each storage drawer, and redirects the camera view downwards toward the drawers. FIG. 4e is an illustrative side view of system 300 showing the relative position between cameras 310, mirror 312 and drawers 330. Light L reflected from any of drawers 330 to mirror 312 is directed to cameras 310.

FIG. 4b is a perspective view identical to FIG. 4a except that a cover of imaging compartment 330 is removed to reveal details of the design. Each camera 310 is associated with a viewing field 311. As shown in FIG. 4b, the combined viewing fields of cameras 310 form the viewing field 340 of the image sensing device. Viewing field 340 has a depth of x. For instance, the depth of viewing field 340 may be approximately 2 inches.

Figure 4C:
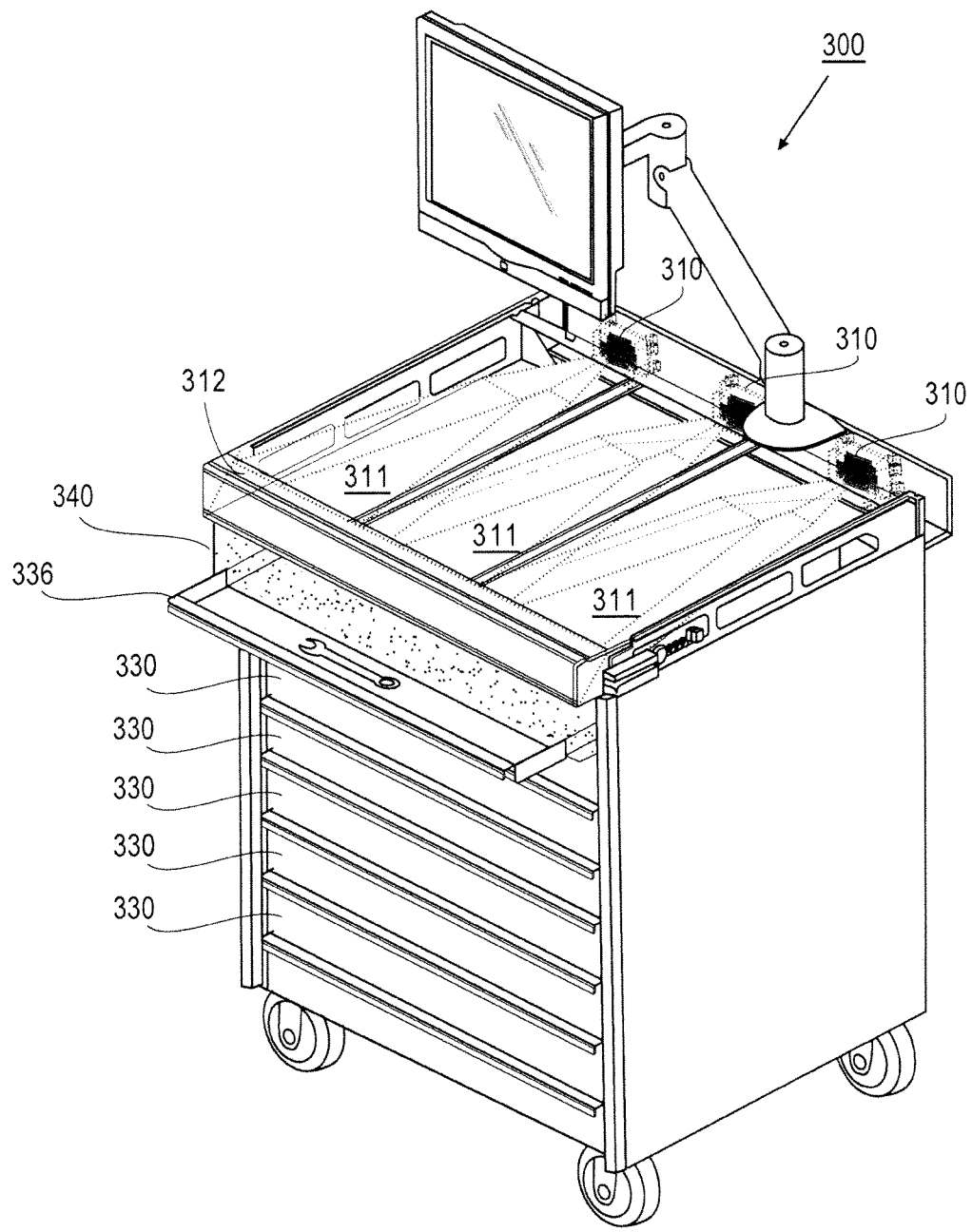

FIG. 4c is an alternative perspective view of tool storage system 300 shown in FIG. 4a, except that a storage drawer 336 now operates in an open mode allowing partial access to its contents or storage locations in storage drawer 336.

This arrangement of cameras 310 and mirror 312 in FIGS. 4a-4c allows cameras 310 the capability of capturing images from the top drawer to the bottom drawer, without the need to substantially change its focal length.

Figure 4D:
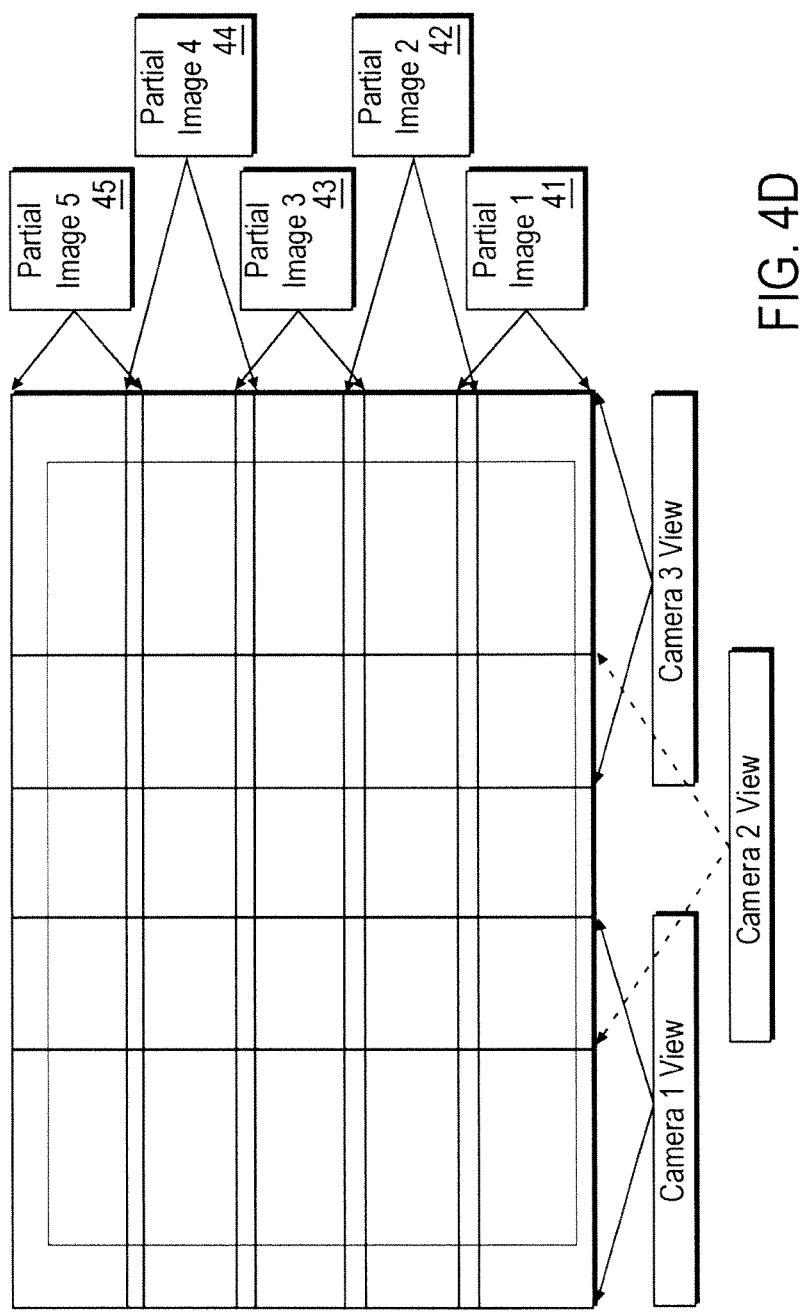
FIG. 4D illustrates how an exemplary image is stitched together.
Figure 4E:
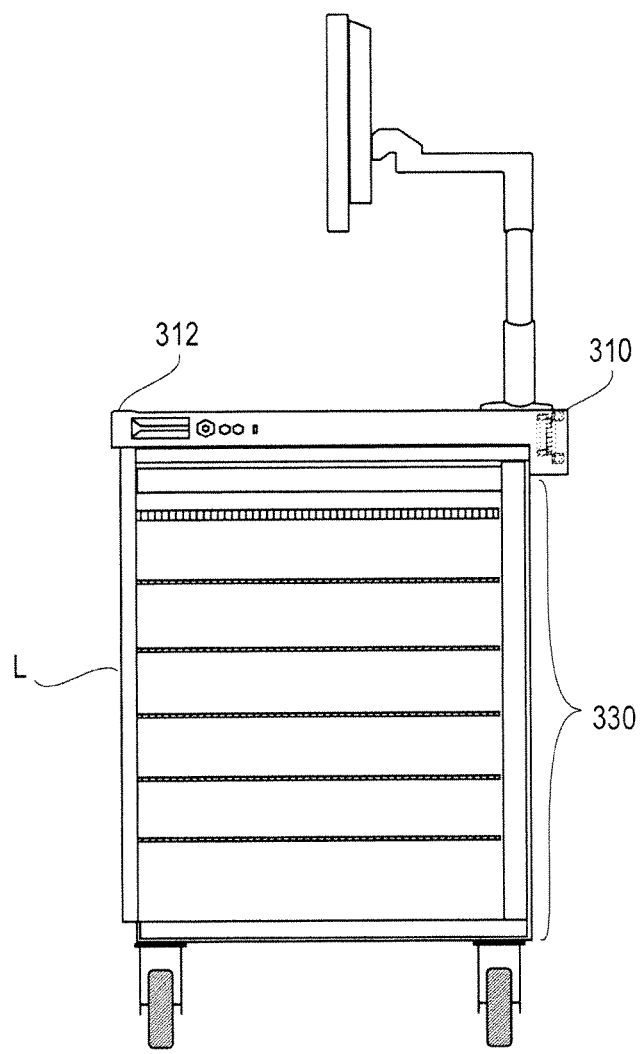

In one implementation, cameras 310 capture multiple partial images of each storage drawer as it is opened or closed. Each image captured by cameras 310 may be associated with a unique ID or a time stamp indicating the time when the image was captured. Acquisition of the images is controlled by a data processor in tool storage system 300. In one implementation, the captured images are the full width of the drawer but only approximately 2 inches in depth. The captured images overlap somewhat in depth and/or in width. As shown in FIG. 4D, the partial images 41-45 taken by different cameras 310 at different points in time may be stitched together to form a single image of partial or entire drawer and its contents and/or storage locations. This stitching may be performed by the data processor or by an attached or remote computer using off-the-shelf software programs. Since images are captured in approximately two inch slices multiple image slices are captured by each camera. One or more visible scales may be included in each drawer. The processor may monitor the portion of the image that contains the scale in a fast imaging mode similar to video monitoring. When the scale reaches a specified or calculated position, the data processing system controls the image sensing device to capture and record an image slice. The scale may also assist in photo stitching. Additionally a pattern such as a grid may be applied to the surface the drawer. The pattern could be used to assist the stitching or image capture process.

In another implementation, the image sensing device includes larger mirrors and cameras with wide angle lens, in order to create a deeper view field x, such that the need for image stitching can be reduced or entirely eliminated.

In one implementation, one or more line scan cameras are used to implement the image sensing device. A line scan camera captures an image in essentially one dimension. The image will have a significant width depending on the sensor, but the depth is only one pixel. A line scan camera captures an image stripe the width of the tool drawer but only one pixel deep. Every time drawer 330 moves by a predetermined partial amount the camera will capture another image stripe. In this case the image stripes must be stitched together to create a usable full drawer image. This is the same process used in many copy machines to capture an image of the document. The document moves across a line scan camera and the multiple image stripes are stitched together to create an image of the entire document.

In addition to a mirror, it is understood that other devices, such as prisms, a combination of different types of lens including flat, concave, and/or convex, fiber optics, or any devices may direct light from one point to another may be used to implement the light directing device for directing light coming from an object to a remote camera. Another option could be the use of fiber optics. The use of light directing device may introduce distortions into the captured images. Calibrations or image processing may be performed to eliminate the distortions. For instance, cameras 310 may first view a known simple grid pattern reflected by the light directing device and create a distortion map for use by the data process processor to adjust the captured image to compensate for mirror distortion.

For better image capture and processing, it may be desirable to calibrate the cameras. The cameras may include certain build variations with respect to image distortion or focal length. The cameras can be calibrated to reduce distortion in a manner similar to how the mirror distortion can be reduced. In fact, the mirror calibration could compensate for both camera and mirror distortion, and it may be the only distortion correction used. Further, each individual cameras may be calibrated using a special fixture to determine the actual focal length of their lenses, and software can be used to compensate for the differences from camera to camera in a single system.

In one implementation, the image sensing device does not include any mirror. Rather, one or more cameras are disposed at the location where mirror 312 was disposed. In this case, the cameras point directly down at storage drawers 330 when then move. In another implementation, each storage drawer 330 has one or more associated cameras for capturing images for that storage drawer.

Determination of Inventory Conditions

System 300 determines the presence or absence of tools in drawers 330 based on captured images using a variety of possible strategies. Suitable software may be executed by the embedded processor or an attached computer (PC) for performing inventory determinations based on captured images.

In one example, system 300 determines an inventory condition of a storage drawer based on empty locations in the drawer. Each storage location in the drawer is configured to store a pre-designated object, such as a pre-designated tool. A non-volatile memory device of system 300 stores information identifying a relationship between each known storage location in the drawer and its corresponding pre-designated object. The memory device also stores information of two baseline images of the drawer: one baseline image having each of its storage locations occupied by the corresponding pre-designated object, and another baseline image having its storage locations unoccupied. In determining an inventory condition of the drawer, the data processor compares an image of the drawer and each of the baseline images. Based on a difference of the images, the data processor determines which storage location in the drawer is not occupied by its corresponding pre-designated object. The identity of the missing object is determined based on the stored relationship identifying each storage locations and their corresponding pre-designated objects.

Another implementation according to this disclosure utilizes specially designed identifier for determining an inventory condition of objects. Depending on whether a storage location is being occupied by an object, an associated identifier appears in one of two different manners in an image captured by the image sensing device. For instance, an identifier may appear in a first color when the associated storage location is occupied by a tool and a second color when the associated storage location is unoccupied. The identifiers may be texts, one-dimensional or two-dimensional bard code, patterns, dots, code, symbols, figures, numbers, LEDs, lights, flags, etc., or any combinations thereof. The different manners that an identifier may appear in an image captured by the image sensing device include images with different patterns, intensities, forms, shapes, colors, etc. Based on how each identifier appears in a captured image, the data processor determines an inventory condition of the object.

FIG. 5 shows an implementation of identifier designs. As shown in FIG. 5, storage location 51 is designated to store tool 510, and storage location 52 is currently occupied by its designated tool 520. Storage location 53 is not occupied by its designated tool. Each storage location 51, 52, 53 has an associated identifier. Depending on whether each storage location 51-53 is being occupied by a corresponding tool, each identifier appears in an image captured by cameras 310 in one of two different manners. For example, each identifier may not be viewable by cameras 310 when a corresponding tool is stored in the respective storage location, and becomes viewable by cameras 310 when an object is not stored in the respective storage location. Similarly, a different implementation may have an identifier viewable by the image sensing device when an object is stored in the respective storage location, and is not viewable by the image sensing device when an object is not stored in the respective storage location.

For instance, the bottom of storage locations 51-53 includes an identifier made of retro-reflective material. Since storage locations 51 and 53 are not occupied by their respective designated tools, their associated identifiers 511 and 513 are viewable to the image sensing device. On the other hand, storage location 52 is currently occupied by its designated tool, its identifier is blocked from the view of the image sensing device. When the particular tool is stored in the storage location, the identifier is blocked from the view of the image sensing device and not viewable by the image sensing device. On the other hand, if the storage location is not occupied by the particular tool, the identifier is viewable by the image sensing device and shows up as a high intensity area on an image of the drawer. Accordingly, a high intensity area represents a missing tool. The system 300 detects locations with missing tools and correlates the empty locations with stored relationship identifying each storage locations and their corresponding tools. The system 300 determines which tools are not in their specified locations in a drawer. It is understood that the identifiers may be implemented in many different manners. For instance, the identifiers may be designed to create a high intensity image when a storage location is occupied and an image with less intensity when the storage location is occupied.

In one implementation, each identifier is implemented with a contact sensor and an LED. As shown in FIG. 5b, storage location 61 is associated with a contact sensor 62 and an LED 63. When contact sensor 61 senses a tool is in storage location 61, a signal is generated by contact sensor 61 and controls to turn off power supply to LED 63. On the other hand, if contact sensor 62 detects that a tool is not in storage location 61, control sensor 62 generates a control signal which controls to turn on LED 63, which creates a high intensity area in an image captured by the image sensing device. Each high intensity area in an image indicates a storage location without an associated tool. The system 300 identifies removed or missing tools by determining which storage locations are not occupied by tools and pre-stored information identifying corresponding tools of the locations. In still another implementation, the identifier is unique to the pre-designated tool stored in each respective storage location. The data processor is configured to determine an inventory condition by evaluating whether at least one viewable identifier exists in an image of the storage locations captured by the image sensing device, and pre-stored relationship between each pre-designated object and a respective identifier unique to each pre-designated object.

In still another implementation, an identifier associated with a storage location creates a high intensity image when the storage location is occupied, and a lower intensity image when the storage location is unoccupied. The system 300 determines which tools exist based on detected identifiers and pre-stored information identifying a relationship between each storage location and the corresponding pre-designated object. In another implementation, the identifier is unique to a pre-designated object stored in each respective storage location. The system 300 determines an inventory condition of existing objects by evaluating identifiers that exist in an image of the storage locations captured by the image sensing device, and pre-stored relationship between each pre-designated object and a respective identifier unique to each pre-designated object.

In still another implementation, each object stored in the system 300 includes an attached identifier unique to each object. The data processor has access to prestored information identifying each tool stored in the system and known information identifying a relationship between each object and a respective identifier unique to each pre-designated object. The data processor determines an inventory condition of objects by evaluating identifiers that exist in an image of the storage locations captured by the image sensing device, and the relationship between each pre-designated object and a respective identifier unique to each pre-designated object. For instance, system 300 stores a list of tools stored in the system and their corresponding unique identifiers. After cameras 310 captures an image of a storage drawer, the data processor determines which identifier or identifiers are in the image. By comparing the identifiers appearing in the image with list of tools and their corresponding unique identifiers, the data processor determines which tools are in the system and which ones are not.

As discussed earlier, identifiers associated with the storage locations may be used to determine which locations have missing objects. According to one implementation, system 300 does not need to know the relationship between each storage location and the corresponding object. Rather, each identifier is unique to a corresponding object stored in the storage location. The data processor of system 300 has access to pre-stored information identifying a relationship between each identifier and the corresponding object, and information identifying each object. In other words, system 300 has access to an inventory list of every object stored in system 300 and its respective unique identifier. When an empty tool storage location is detected by system 300, the corresponding identifier is extracted from the image and decoded by system software. As each identifier is unique to a corresponding object, system 300 is able to determine which object is missing by checking the relationship between each identifier and the corresponding object, and the inventory list of objects. Each identifier unique to an object stored in a storage location may be disposed next to the storage location or in the storage location. In one implementation, the identifier is disposed next to the storage location and is always viewable to the image sensing device no matter whether the location is occupied by an object or not. In another implementation, when an identifier is disposed in the corresponding location, the identifier is not viewable to the image sensing device when the location is occupied by an object, and is viewable to the image sensing device when the location is not occupied by an object.

An implementation of this disclosure utilizes combinations of baseline images and identifiers unique to objects to determine an inventory status. For example, a baseline image may include information of a storage drawer with all storage locations occupied with their respective corresponding objects, wherein each storage location is associated with an identifier unique to an object stored in the storage location. An inventory condition is determined by comparing an image of the storage locations and the baseline image, to determine which locations are occupied by objects and/or which locations have missing objects. Identifications of the missing objects are determined by identifying the identifier associated with each storage location with missing object.

Another implementation of this disclosure utilizes unique combinations of identifiers to determine an inventory status. For instance, each storage location may have a first type of identifier disposed in the location and a second type of identifier unique to an object stored in the storage location and disposed next to the storage location. The first type of identifier is viewable to an image sensing device when the location is not occupied by an object and not viewable by an image sensing device when the location is occupied by an object. The first type of identifier may be made of retro-reflective material. If a storage location is not occupied by an object corresponding to the storage location, the identifier of the first type is viewable by the image sensing device and shows up as a high intensity area. Accordingly, each high intensity area represents a missing object, which allows system 300 to determine which locations having missing objects. Based on identifiers of the second type associated with those locations with missing objects, system 300 identifies which objects are missing from system 300. Consequently, an inventory condition of system 300 is determined.

According to still another implementation, system 300 uses image recognition methods to identify an object missing from system 300. System 300 has access to an inventory list indicating which tools are stored in each drawer or system 300. However, system 300 does not have to know where the tools are stored. The tools are placed in foam cutout locations specific for each tool. Using characteristics such as size, shape, color, and other parameters image recognition software identifies each tool in the drawer. Missing tools are simply the tools on the inventory list that are not identified as being in the drawer.

System 300 records access information related to each access. The access information includes time, user information related to the access, duration, user images, images of storage locations, identities of storage units or contents of the storage system, objects in the storage system, etc., or any combinations thereof. In one implementation, system 300 includes a user camera that captures and stores image of the person accessing storage system 300 each time access is authorized. For each access by a user, system 300 determines an inventory condition and generates a report including associating the determined inventory condition with access information.

Timed Image Capturing

Implementations of this disclosure utilize uniquely timed machine imaging to capture images of system 300 and determine an inventory condition of system 300 according to the captured images. In one implementation, system 300 activates or times imaging of a storage drawer based on drawer locations and/or movements, in order to create efficient and effective images. For instance, a data processor of the system 300 uses drawer positions to determine when to take overlapping partial images as discussed relative to FIGS. 4*a*-4*e*, to assure full coverage of a drawer being accessed by a user. In another example, drawer position information may be useful to the stitching software in the construction of a full drawer image. Drawer position information may be used to help locate the positions of the cutouts in the drawer.

In one implementation, the data processor of system 300 controls the image sensing device to form images of a drawer based on a pre-specified manner of movement by the drawer. For instance, for each access, system 300 only takes images of the drawer when it is moving in a specified manner or in a predetermined direction. According to one implementation, the image sensing device takes images when a drawer is moving in a direction that allows decreasing access to its contents or after the drawer stops moving in the direction allowing decreasing access to its contents. For example, cameras may be controlled to take pictures of drawers when a user is closing a drawer, when or after a drawer stops moving in a closing direction or when the drawer is completely closed. In one implementation, no images are taken when the drawer is moving in a direction allowing increasing access to its contents, such as when a drawer moves from a close position to an open position.

Figure 6C:
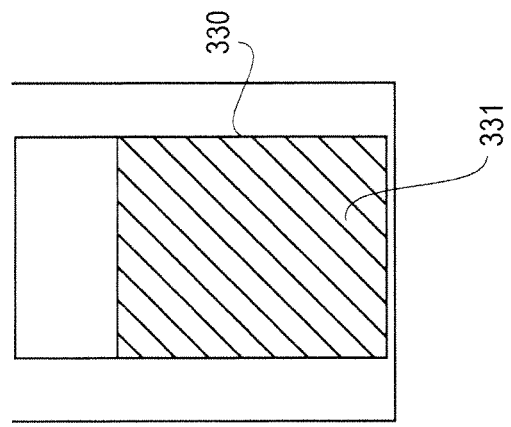
FIGS. 6A-6C illustrate an example of timed image capturing.
Figure 6B:
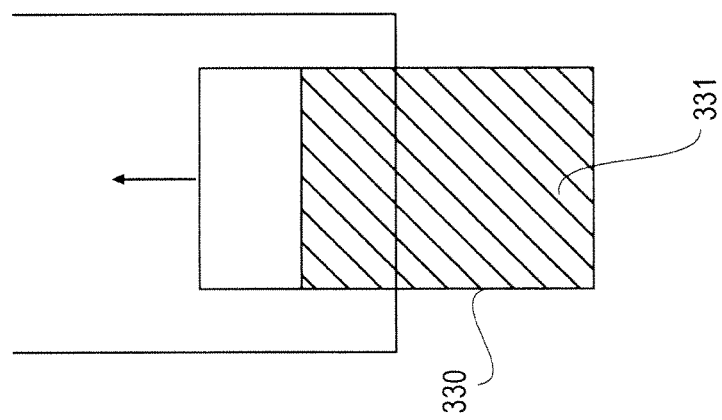
Figure 6A:
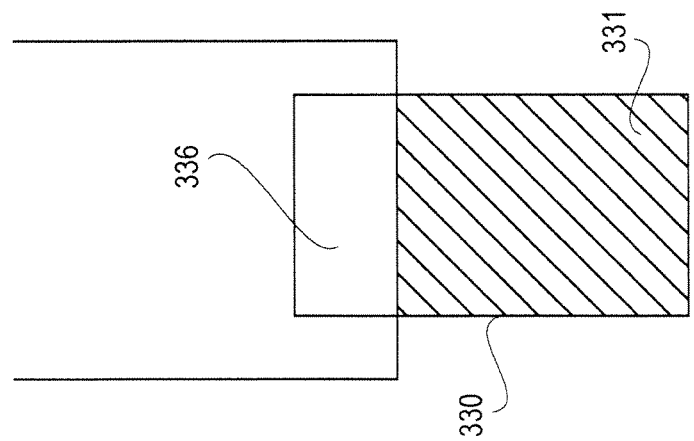

FIG. 6 shows an operation of this implementation in the setting of an exemplary system described in FIGS. 4*a*-4*d*. As shown in FIG. 6*a*, a user partially opens drawer 330 to expose storage locations in shaded area 331. Since the user only opens drawer 330 half way, the user has no access to storage locations in area 336. After the user finds the tool he needs from area 331, the user starts to close drawer 330 (FIG. 6*b*). When sensors in system 300 detect the closing movement of drawer 330, which allows decreasing access to contents, the data processor activates the image sensing device, such as cameras 310, to capture partial images of shaded area 331 until drawer 330 is fully closed (FIG. 6*c*). Since the user never has any access to area 336, it is safe to assume that an inventory condition relative to area 336 remains unchanged from the previous access. However, for area 331, since the user had access to that area, an inventory associated with that area needs to be updated. Any changes in access or replacement of tools would occur only in area 331. Therefore, system 300 determines an inventory condition of drawer 330 associated with the access by the user based on the captured image covering area 331 and inventory information related to area 336 of a previous access, the information of which may be retrieved from a non-volatile memory device of system 300 that stores inventory information associated with each access to system 300. The determined inventory condition for drawer 330 is then stored in the non-volatile memory device. In one implementation, the non-volatile memory device stores an initial inventory condition of drawer 300 which represents a baseline inventory condition with which later inventory conditions may compare. For instance, after each auditing of tool inventory condition, system 300 stores the inventory condition after the audit as the baseline inventory condition.

Locations, movements and moving directions of each storage drawer may be determined by using sensors to measure location or movement sensors relative to time. For instance, location information relative to two points in time may be used to derive a vector indicating a moving direction.

Examples of sensors for detecting a position, movement or moving direction of storage drawers include a sensor or encoder attached to a drawer to detect its position relative to the frame of system 300; a non-contact distance measuring sensor for determining drawer movement relative to some position on the frame of the system 300, such as the back of the system 300; etc. Non-contact sensors may include optical or ultrasonic sensors. A visible scale or indicator viewable by cameras 310 may be included in each drawer, such that camera 210 could read the scale to determine drawer position.

A change in an inventory condition, such as removal of tools, occurring in the current access may be determined by comparing inventory conditions of the current access and the access immediately before the current access. If one or more objects are missing, system 300 may generate a warning signal, such as audible or visual, to the user, generate a notice to a remote server coupled to system 300, etc.

In another implementation, the image sensing device is configured to form images of the storage locations both when storage drawer 330 moves in a direction allowing increasing access to its contents, and when storage drawer 330 subsequently moves in a direction allowing decreasing access to its contents. For example, when a user opens drawer 330 to retrieve tools, the moving direction of drawer 330 triggers cameras 310 to capture images of drawer contents when it moves. The captured image may be designated as a "before access" image representing a status before a user has accessed the contents of each storage drawer. An inventory condition is determined based on the captured images. This inventory condition is considered as a "before access" inventory condition. Cameras 310 stops capturing images when drawer 330 stops moving. When the user closes drawer 330, the moving direction of drawer 330 triggers cameras 310 to capture images of drawers 330 again until it stops or reaches a close position. An inventory condition of the drawer is determined based on images captured when the user closes drawer 330. This determined inventory condition is designated as an "after access" inventory condition. A difference between the before access inventory condition and the after access inventory condition indicates a removal or replacement of tools. Other implementations of this disclosure control cameras to take the "before access" image before a storage drawer is opened or after the storage drawer is fully opened or when its contents are accessible to a user. According to another implementation, the image sensing device is timed to take an image of each drawer 330 when it was detected that access by a user is terminated. As used herein in this disclosure, terminated access is defined as a user no longer having access to any storage locations, such as when drawer 330 is closed or locked, when door 250 is closed or locked, etc., or an indication by the user or the system that access to the storage system is no longer desired, such as when a user signs off, when a predetermined period of time has elapsed after inactivity, when a locking device is locked by a user or by system 300, etc. For each access, a position detector or contact sensor is used to determine whether drawer 330 is closed. After the drawer is closed, the image sensing device captures an image of drawer 330. The data processing system then determines an inventory condition based on the captured image or images. A difference in the inventory condition may be determined by comparing the determined inventory condition of the current access to that of the previous access.

Figure 7A:
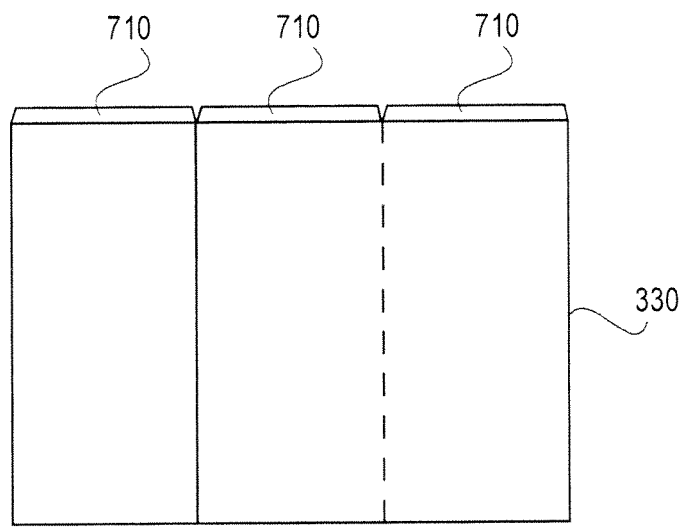
FIGS. 7A and 7B are different views of another implementation of camera designs.
Figure 7B:
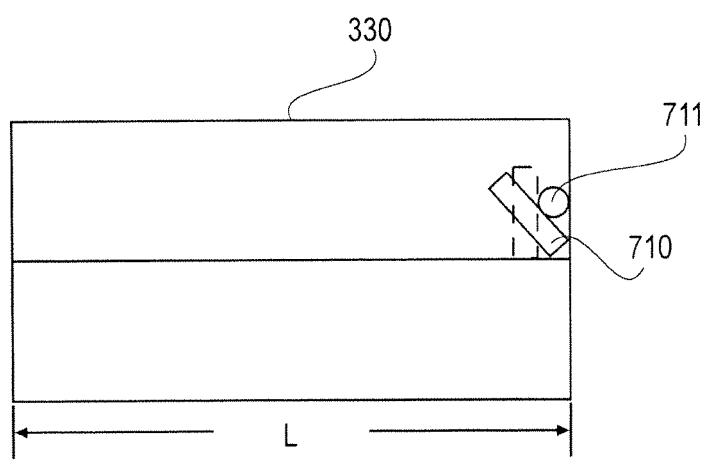

FIGS. 7*a* and 7*b* show an exemplary drawer having cameras configured to capture images of the drawer when it is closed. FIG. 7*a* is a top view of a drawer 330 having three cameras 770. Cameras 770 have sufficient widths of viewing fields to cover the entire width of drawer 330. FIG. 7b is a side view of drawer 330 shown in FIG. 7a. Camera 710 tilts down a specific angle and has a sufficiently large viewing field to cover the entire length L of drawer 330. In one implementation, cameras 710 does not have to cover the entire length L with one image. Rather, camera 710 may be rotatably attached to a hinge 711, which allows camera to tilt up and down vertically, to cover different sections of drawer 330. Images captured by cameras 710 are stitched or combined to form an image of the entire drawer.

It is understood that other camera configurations or designs may be utilized to capture images of drawer 330 when it is closed. In one implementation, one or more moving cameras are used to capture images of a drawer after it is closed. In this implementation, the cameras are configured to move over the drawer and capture image slices that can be stitched together to create a full drawer images. The cameras may be moved by a motor along a rail. Either 2D or line scan cameras can be used in this model. A sensor may be used to determine the location of the cameras to assist in stitching or other functions such as camera position control. A variation of this model uses a stationary camera for each drawer viewing across the top of the drawer and a 45 degree moving mirror that moves over the draw and redirects the camera view towards the drawer. Another variation is to provide a camera moving from one drawer to another. Still another variation is to provide a moving mirror for each drawer and one or more cameras moving between drawers. The movements of the cameras and mirrors are synchronized to form images of each storage drawer. The cameras and drawers may be driven by motors or any means that provide power.

If the image sensing device requires illumination to obtain acceptable image quality, illumination devices may be provided. For example, LEDs may be used to illuminate the image area. It is understood that other illumination sources may be used. In one implementation, LEDs are disposed surrounding the lens or image sensors of the camera and light is transmitted along the same path as the camera view. In an implementation including the use of a light directing device, such as a mirror, the emitted light would be directed by the mirror towards the drawers. The timing and intensity of the illumination is controlled by the same processor that controls the camera and its exposure. In some possible configurations of cameras it may be desirable to implement background subtraction to enhance the image. Background subtraction is a well known image processing technique use to remove undesirable static elements from an image. First an image is captured with illumination off. Then a second image is captured with illumination on. The final image is created by subtracting the illumination off image from the illumination on image. Image elements that are not significantly enhanced by the illumination are thereby removed from the resulting image.

According to another implementation, for each access, the image sensing system 300 is timed to capture at least two images of drawer 300: at least one image (initial image) captured before a user has access to storage locations in drawer 300 and at least one image captured after the access is terminated, as discussed earlier. The initial image may be taken at any time before the user has access to the contents or storage locations in the drawer. In one implementation, the initial image is captured when or after a user requests access to system 300, such as by sliding a keycard, punching in password, inserting a key into a lock, providing authentication information, etc. In another implementation, the initial image is captured before or in response to a detection of drawer movement from a close position or the unlock of a locking device of system 300.

The data processing system of system 300 determines an inventory condition based on the initial image, and assigns the determined inventory condition as "before access" inventory condition; and determine an inventory condition based on the image captured after the access is terminated and designated the determined inventory condition as "after access" inventory condition. A change in the inventory condition of objects in system 300 may be determined based on a comparison of the "before access" and "after access" inventory conditions or a comparison of the initial image and the image captured after the access is terminated.

Concepts and designs described above may be applicable to other types of storage systems, such as a type shown in FIG. 1B, where a single door controls the access to multiple shelves or drawers. In one implementation, the image sensing device may be timed to capture images of the storage locations when or after a detected termination of access, such as closing door 250, locking door 250, signing out, etc. It is understood that various types of sensors, such as contact sensors, infrared sensors, may be used to determine when a door is closed. Similar to the discussions earlier, the image sensing device captures images of the storage locations, and determine an "after access" inventory condition based on the captured image. A change in the inventory condition related to the access by comparing an inventory condition of the current access and that of the last access. According to another implementation, the image sensing device is timed to take "before access" images of the storage locations before a user has access to the storage system. For instance, the cameras may be timed to capture images of the storage locations when or after a user requests access to the system, after detecting an opening of door 250, after receiving authentication information from a user, etc. The storage system determines a "before access" inventory condition based on the "before access" image. A change in the inventory condition may be determined according to a difference between the "before access" and "after access" inventory conditions, or a difference between the "before access" and "after access" images.

Networked Storage Systems

Figure 8:
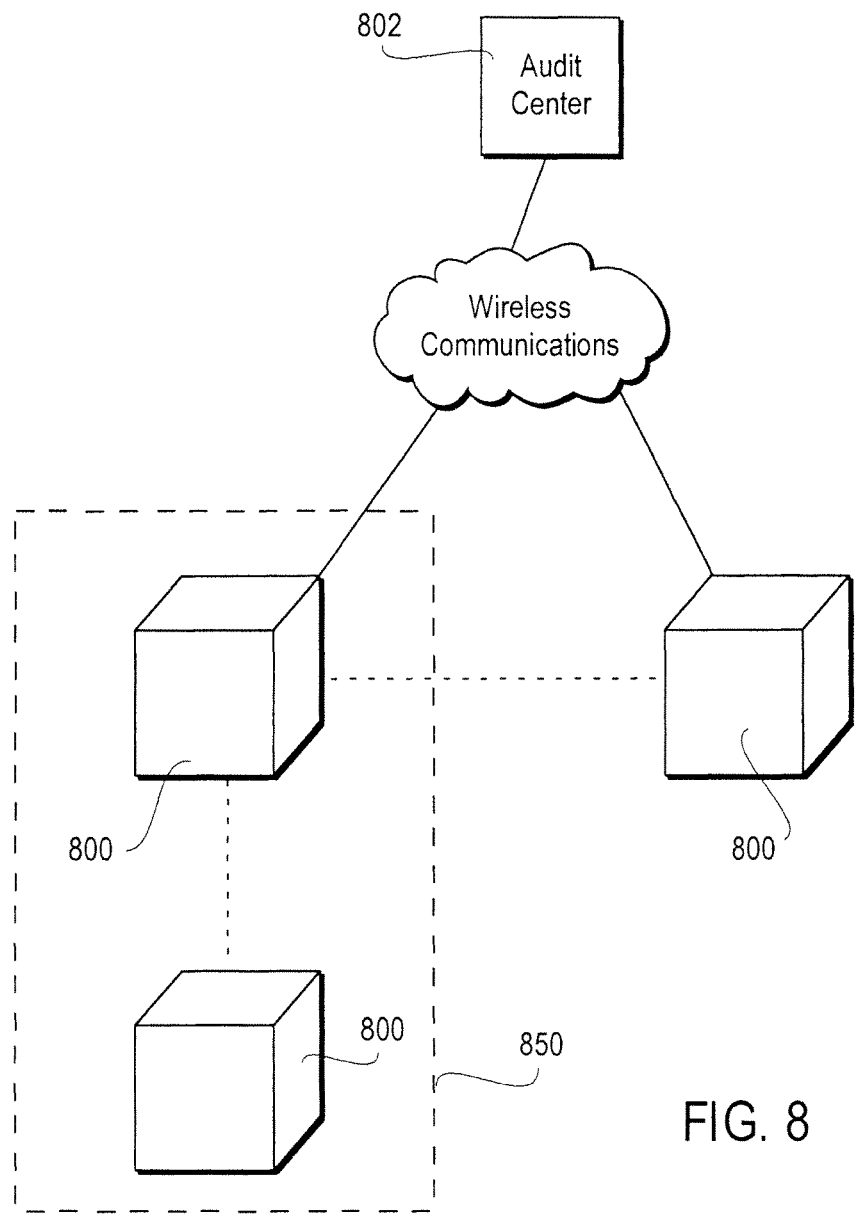
FIG. 8 is a block diagram of an exemplary networked inventory control system.

Storage systems described in this disclosure may be linked to a remote server in an audit center, such that inventory conditions in each storage system is timely updated and reported to the server. As shown in FIG. 8, a server 802 is coupled to multiple storage systems 800 via a wireless network. Server 802 may include a database server, such as a Microsoft SQL server. Information related to authentication, authorized users, inventory conditions, audit trails, etc., is stored in the database.

In one implementation, each storage system 800 is provided with a data transceiver, such as an 802.11g or Ethernet module. The Ethernet module connects directly to the network, while a 802.11g module may connect through a 802.11g router connected to the network. Each of these network modules will be assigned a static or dynamic IP address. In one implementation, storage systems 800 check in to the server through the data transceivers on a periodic basis, to download information about authorized users, authorization levels of different users or different keycards, related storage systems, etc. Storage systems 800 also upload information related to the systems such as inventory conditions, drawer images, tool usage, access records, information of user accessing storage systems 800, etc., to server 802. Each storage system 800 may be powered by an AC source or by a battery pack. An uninterruptible power supply (UPS) system may be provided to supply power during a power failure.

Server 802 allows a manager or auditor to review access information related to each storage system 800, such as inventory conditions and information related to each access to storage system 800 like user information, usage duration, inventory conditions, changes in inventory conditions, images of drawers or contents of the storage system, etc. In one implementation, server 802 may form a real time connection with a storage system 800 and download information from that storage system. The manager or auditor may also program the access control device on each storage system through server 802, such as changing password, authorized personnel, adding or deleting authorized users for each storage system, etc. Authorization data needed for granting access to each storage system 800 may be programmed and updated by server 802 and downloaded to each storage system 800. Authorization data may include passwords, authorized personnel, adding or deleting authorized users for each storage system, user validation or authentication algorithm, public key for encryptions and/or decryptions, black list of users, white list of users, etc. Other data updates may be transmitted to each storage system from server 802, such as software updates, etc. Similarly, any changes performed on storage system 800, such as changing password, adding or deleting authorized users, etc., will be updated to server 802.

For each access request submitted by a user, a storage system authenticates or validates the user by determining a user authorization according to user information input by the user via the data input device and the authorization data. According to a result of the authentication, the data processor selectively grants access to the storage system by controlling an access control device, such as a lock, to grant access to the storage system 800 or one or more storage drawers of one or more storage systems 800.

Server 802 also allows a manager to program multiple storage systems 800 within a designated group 850 at the same time. The manager may select which specific storage systems should be in group 850. Once a user is authorized access to group 850, the user has access to all storage systems within group 850. For instance, a group of storage systems storing tools for performing automotive service may be designated as an automotive tool group, while another group of storage systems storing tools for performing electrical work may be designated as an electrical tool group. Any settings, adjustments or programming made by Server 802 in connection with a group automatically apply to all tool storage systems in that group. For instance, server 802 may program the tool storage systems by allowing an automotive technician to access all tool storage systems in the automotive tool group, but not those in the electrical tool group. In one implementation, each system 800 only includes minimal intelligence sufficient for operation. All other data processing, user authentication, image processing, etc., are performed by server 802.

Similarly, server 802 also allows a manager to program multiple storage drawers 330 within a designated group at the same time. The manager may select which specific storage drawers, of the same system or different storage systems, should be in the group. Once a user is authorized access to the group, the user has access to all storage drawers within the group. For instance, a group of storage systems storing tools for performing automotive tools may be designated as an automotive tool group, while another group of storage systems storing tools for performing electrical work may be designated as an electrical tool group.

In another implementation, an exemplary networked storage system as shown in FIG. 8 utilizes hierarchical authorization architecture to manage access to storage systems. One or more storage systems 800 are given the status of master storage system. Each master storage system has one or more associated slave storage systems. If a user is authorized to access to a master storage system, the same user is automatically authorized to access any slave storage system associated with that master system. On the other hand, if a user is authorized to access a slave storage system, the authorization to the slave system does not automatically grant the user access to its associated master storage system or other slave storage systems associated with the same master storage system.

According to still another implementation, an exemplary networked storage system as shown in FIG. 8 grants user access by utilizing multiple hierarchical authorization levels. Each authorization level is associated with pre-specified storage systems, which can be programmed by a manager via server 802. When a user is assigned a specific authorization level, this user is authorized to access all storage systems associated with the assigned authorization level and all storage systems associated with all authorization levels lower than the assigned authorization level in the authorization hierarchy, but not to those associated with authorization levels higher than the assigned authorization level in the authorization hierarchy.

Audit

An exemplary inventory control system according to this disclosure tracks various types of information related to each access. For example, system 800 records date, time and/or duration for each access, and corresponding user information submitted by a user to obtain access to system 800. As discussed earlier, system 800 captures one or more images of the storage unit during each access for determining an inventory condition. The images are linked to each access and accessing user and stored in system 800. System 800 may store the information locally or upload the obtained information to server 802 via the wireless communication network, as shown in FIG. 8.

Server 802 may process and compile the information received from each system 800, to create an audit trail for each server 802. The audit trail is accessible by managers or users with suitable authorization levels. Different types of audit trails may be generated and retrieved based on preference of authorized users. For instance, an audit trail may be generated for one or more specific dates, one or more specific users, one or more specific tools, one or more IDs, etc. Additional information and analysis may be generated and provided by server 802. For example, system 802 may track usages of a specific tool over time, and generate a report summarizing a usage frequency for each tool for evaluation. Such report may be used to determine what tools are used more frequently and which tools probably are not needed because they are used less often than others.

FIG. 9a shows an exemplary screen of an audit trail with respect to a specific storage system 800. Each access to system 800 is identified by Date/Time 920 and user information 910 of users associated with each access. User information may include any information submitted by a user when requesting access to system 800, such as finger prints, facial recognition images, user images taken by user cameras, passwords, information stored in keycards, any information for authentication, etc. In one implementation, data of user facial characteristics of each user is stored in system 800 or server 802. For each access, an image of a user accessing system 800 is captured by a user camera. User information submitted by the user for gaining access to system 800, such as information stored in a keycard and/or password, is collected. The captured image is compared against user facial characteristics of a user identified by the user information. System 800 or server 802 determines whether the facial characteristics of the user accessing system 800 matches facial characteristics of the user identified by the user information.

Figure 9B:
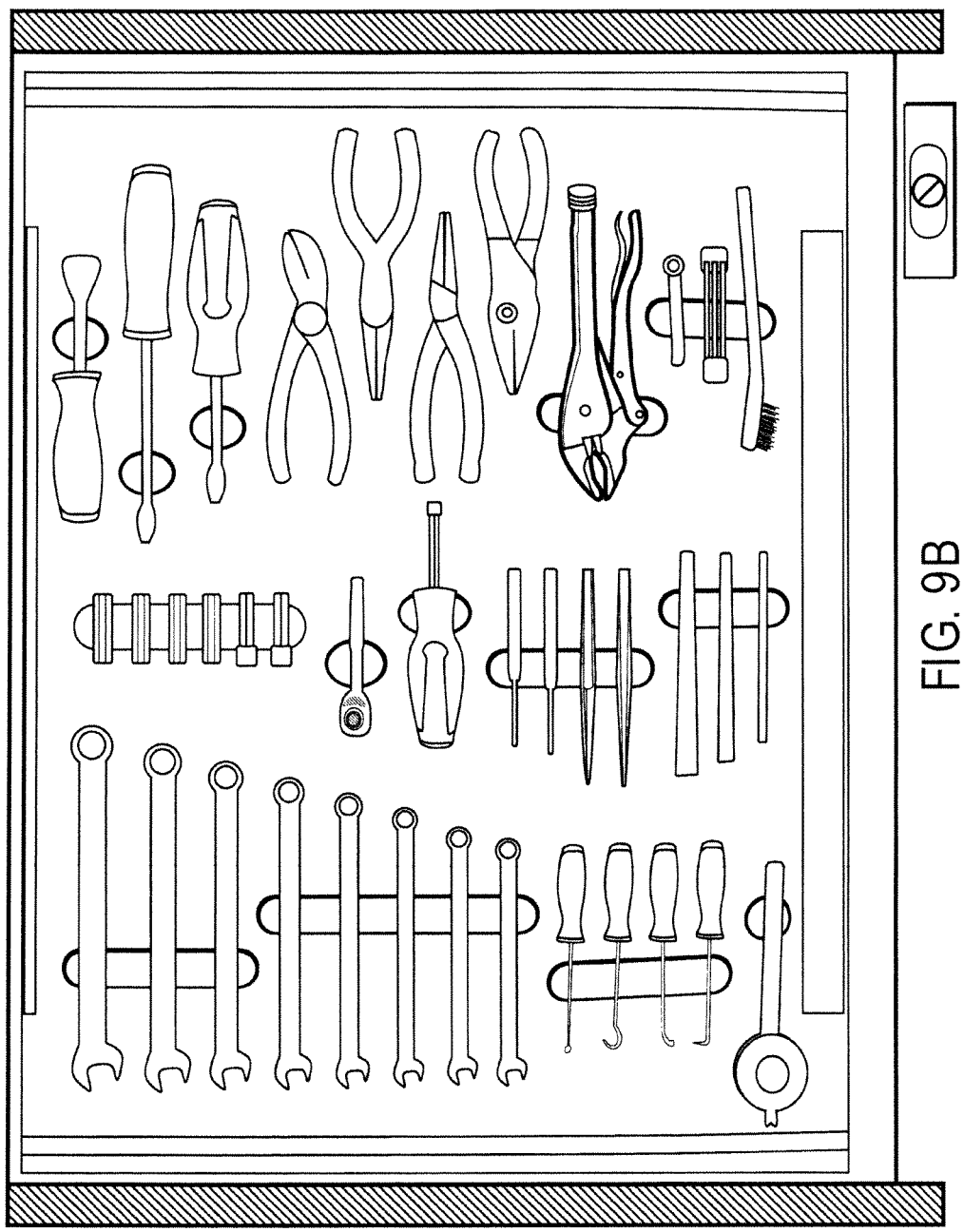
Figure 9C:
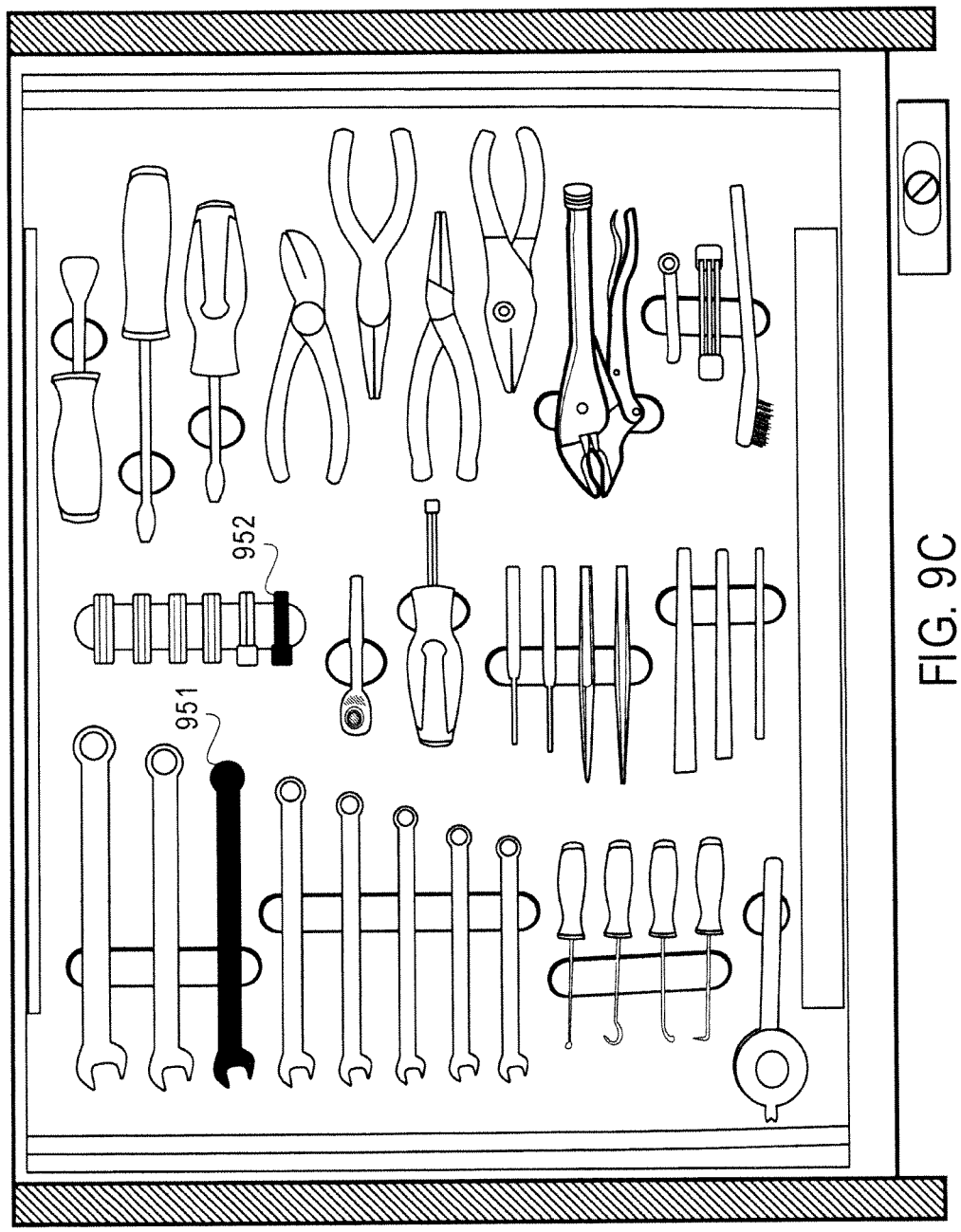
Figure 9D:
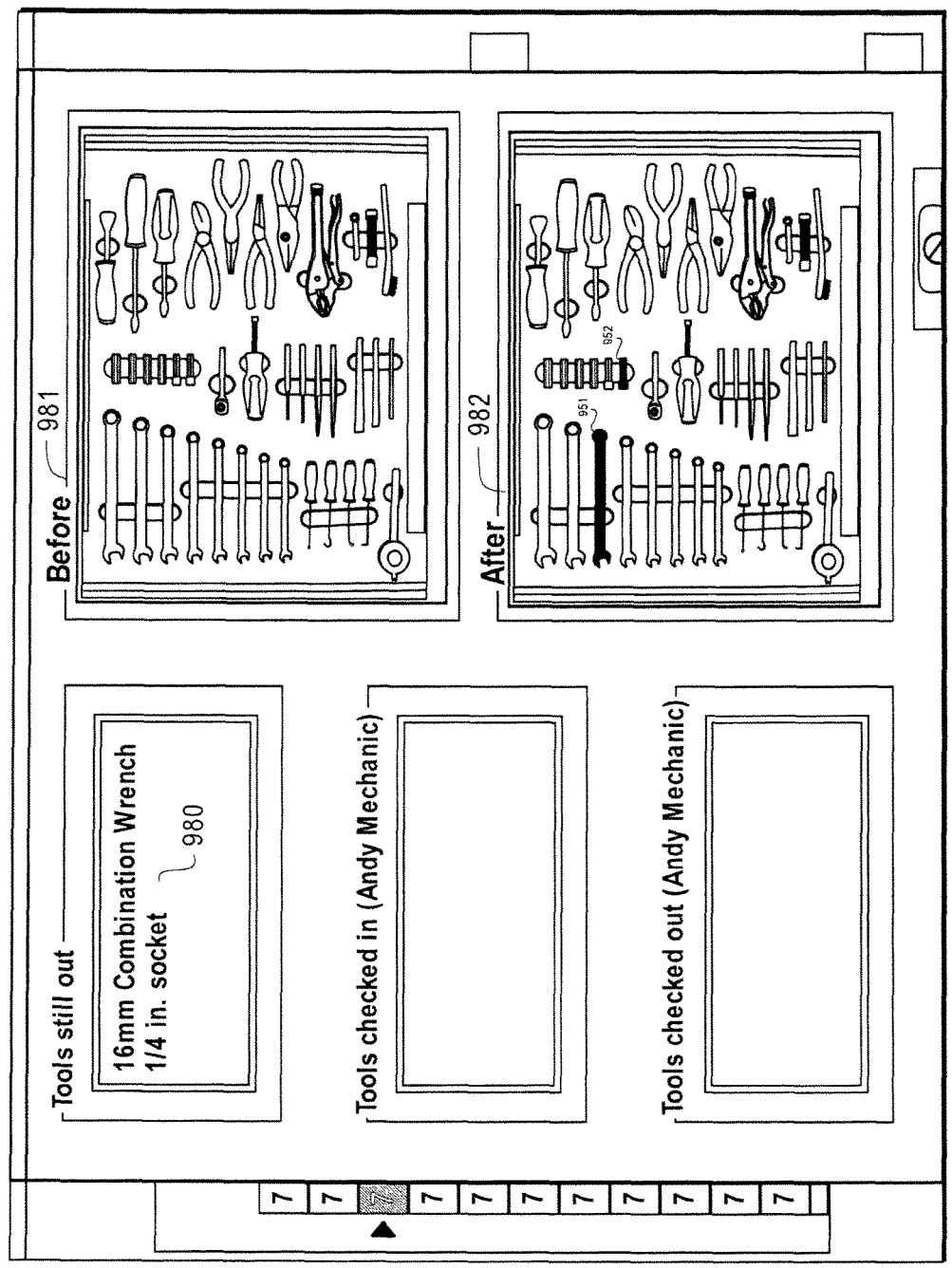

One or more images are taken during each access to storage system 800. FIG. 9*b* shows an exemplary "before access" image taken by cameras of system 800 before a user has access to the storage locations or when the drawer is moving in the first direction, as discussed earlier in this disclosure. As shown in FIG. 9*b*, each tool is properly stored in its corresponding storage location. FIG. 9*c* shows an exemplary "after access" image taken by cameras of system 800 after the access is terminated or when a storage drawer moves in the second direction as discussed earlier. As shown in FIG. 9*c*, tools corresponding to storage locations 951 and 952 are missing. Based on the image shown in FIG. 9*c*, system 800 determines that tools in storage locations 951 and 952 are missing. An audit trail is generated regarding the missing tools and the user associated with the access. FIG. 9*d* shows an exemplary record stored in system 800 and/or server 802, in which both "before access" and "after access" images 981 and 982 are stored. Missing tools are identified according to "after access" image 982 and listed in area 980.

Work Order Scanning and Retrieval of Associated Information

According to this embodiment, an inventory control system for monitoring the removal and replacement of objects stored in the system comprises a storage container including a plurality of storage locations for storing objects, a sensing device configured to detect the presence or absence of objects in the storage locations, a display device, a barcode reader and a data processor. The data processor is configured to receive work order data identifying a particular work order (e.g., from the barcode reader); receive information associated with the work order based on the work order data; and display the information associated with the work order on the display device.

Work orders are written which describe the work to be done, the location of the work, a document number for work processes, a document number for the tools to be used in the performance of the job, requirements and other possible work-related activities, and documents. The work orders may include a bar code or other identifying mark which is machine readable, and for which a computer can be programmed to store information. Currently, certain tool control systems allow a work order to be typed or scanned with a barcode or graphically selected from a predefined list. These systems associate a work order number with a tool issue transaction for reporting purposes, but do not utilize stored information associated with the work order.

Figure 10:
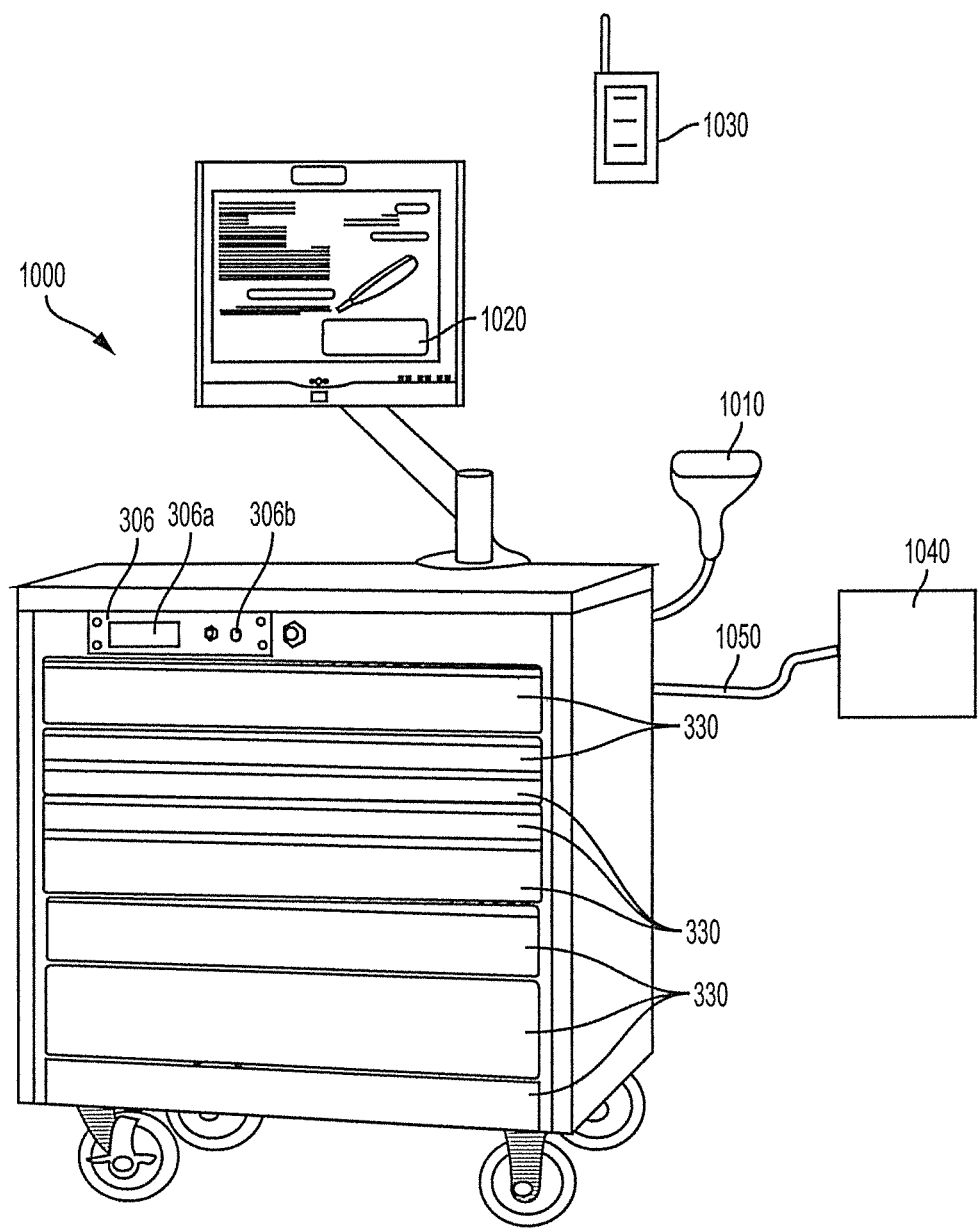
FIG. 10 shows an exemplary tool storage system according to this disclosure.
Figure 11:
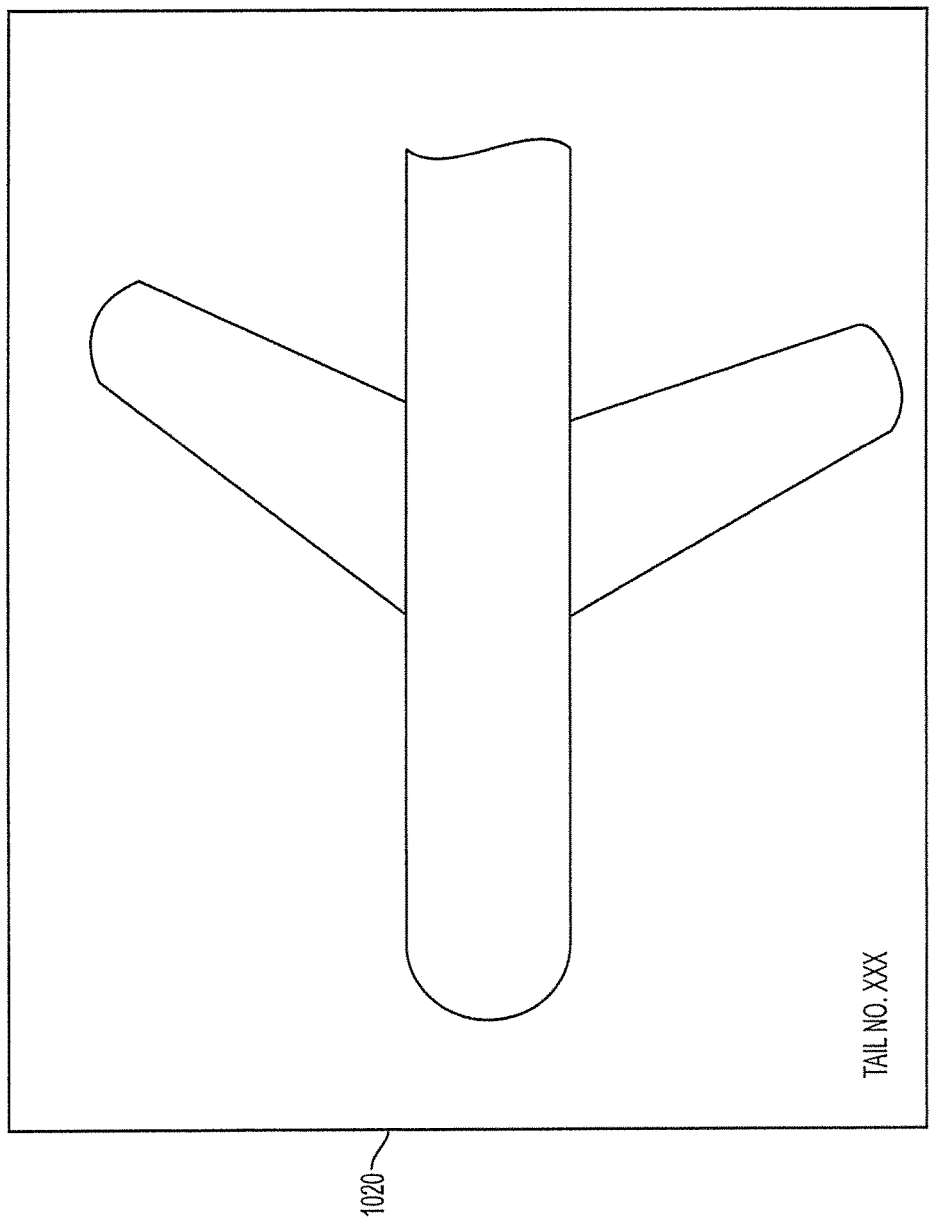
FIG. 11 illustrates a graphical display according to this disclosure.

This disclosure describes features that enable an automated tool control storage device to read the barcode on a work order and associate it with stored data. Referring now to FIGS. 10 and 11, in this disclosed embodiment, an automated tool control system 1000 is equipped with a bar code reader 1010. System 1000 is otherwise similar to system 300 described herein above with reference to FIG. 3.

The bar code reader 1010 provides data to the system 1000 in the form of a keyboard wedge. This information is associated with a particular work order, tool list, special instructions, and other prestored data.

Work orders are entered at the tool control system 1000 point of access. For example, a user may have a printed work order containing a bar code or other encoded information that could be electronically read at the tool control system 1000 by bar code reader 1010. Alternatively, the work order could be sent from a networked device such as a manager's computer, or a work order identifier could be manually entered by the user via a keyboard (not shown) or a touch screen 1020 at the tool control system 1000.

In further embodiments, the user selects a work task graphically. For example, a user could enter an aircraft tail number at touch screen 1020 and then be presented with a top down view of the aircraft, as shown in FIG. 11. The user could then touch the location of the aircraft where work will be performed. Alternatively, a work order or associated information could be fetched by interfacing the tool control system to an existing information system, such as a customer's maintenance and repair operations (MRO) database.

In further embodiments, the system 1000 associates the user, work order, and any issued inventory (i.e., tools from the drawers 330) together for audit purposes. A user marks an open work order as closed at touch screen 1020 after returning all inventory, allowing for measurement of work order time to complete metrics. In certain embodiments, a user manually enters information about deviations from work instructions, or a reason the work order could not be completed. This information is electronically forwarded to a supervisor for problem resolution.

In other embodiments, work orders are automatically dispensed by the tool control system. If the system is programmed with a list of pending work orders and the users who are qualified to complete them, it can present a new work order to a user after a previous work order is marked complete.

In other embodiments, a specific work location may be associated with a given work order. The tool control system 1000 can inform the user of this location by displaying a map or instructions to the required location at screen 1020, identifying an aircraft tail number or other navigation aid.

In other embodiments, work instructions, inspection forms, and/or other required documentation is associated with a given work order. These documents are displayed on screen 1020 at the tool control system 1000, sent to a printer, or transferred to a user display device 1030, such as a laptop, tablet, or smart phone. In certain embodiments, the tool control system 1000 contains user manuals with work instructions in its inventory, and directs the user to check out the appropriate manual for a given work order. Documents requiring user feedback are filled out and saved at the tool control system 1000 for audit purposes.

Figure 12:
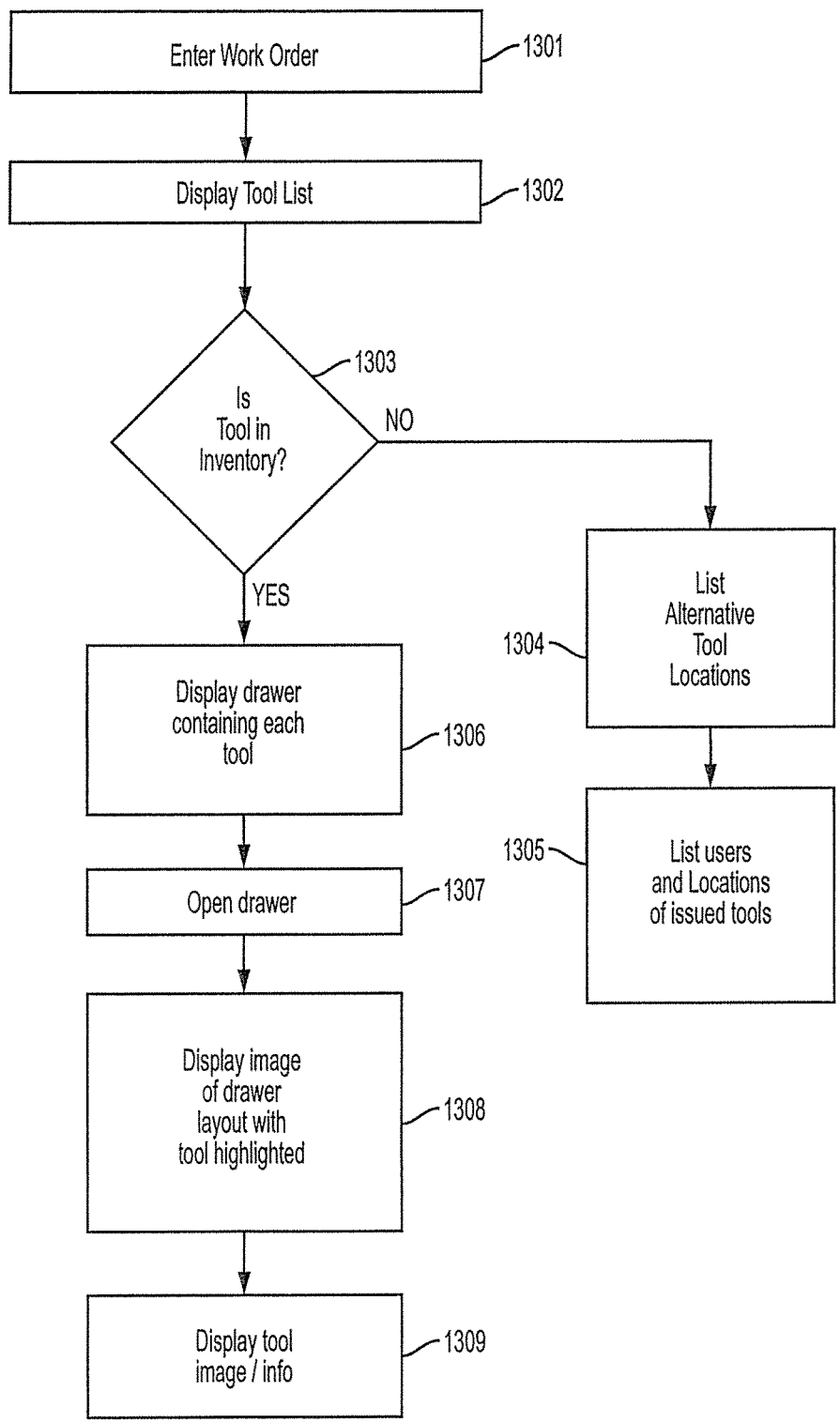
FIG. 12 is a flow chart illustrating a technique for using work order information according to this disclosure.

In other embodiments, a required tool list is associated with a given work order. Referring now to FIG. 12, when a work order is entered (step 1301), the tool control system 1000 displays an associated required tool list (step 1302). The system will confirm that its inventory contains the required tools (step 1303). If a required tool is not in the current system inventory, the system displays a list of authorized alternative tool locations at screen 1020 that contain the required tool (step 1304). It also identifies users and locations of required tools that have been issued from the system (step 1305). In certain embodiments, the system 1000 guides the user to specific locations of each tool. For example, an automatic tool control tool box displays the drawer or tray that contains each required tool (step 1306). When that drawer or tray is opened at step 1307, the system displays an image of the drawer or tray layout with the required tool(s) flashing or highlighted (step 1308). It could also display an image of the tool and any individualized tool information for a selected tool (step 1309).

Display of Kit Contents in an Automatic Tool Control System

According to this disclosure, an inventory control system for monitoring the removal and replacement of objects has at least one drawer or tray including storage locations for storing objects, and at least one sensing device configured to detect the presence or absence of objects in the storage locations. A data processor is configured to receive information representing a kit (i.e., a set of tools identified by the system as a group rather than as individual tools) and their contents, and further configured to display an image of the kit or a listing of the contents of the kit when the kit is returned to the tool storage device storage location after being issued.

In any automated tool control system, whether it utilizes imaging technology, radio frequency identification (RFID) tags or any other means, verifications of tools contained in kits (e.g., tap and die sets, drill bit sets) is problematic at best. In an imaging based system, the identifying characteristics are the outer surface and shape of the kit box. The imaging system does not see through the top and cannot verify contents. In an RFID solution, the RFID tags the box, but internal contents may be too small to tag. Therefore, the user cannot be sure the tools are present unless a physical audit is done of the contents of the kit An additional problem exists in that even when the contents of the kit are audited, there is no automated method of ensuring the auditors know the exact contents of the kits. As a result, even if the kits are audited, one cannot be sure that the complete and correct contents are present, or if a part is missing.

According to this embodiment, the automated tool control system is programmed to require an audit of a kit's contents by at least one user when the kit is returned to the tool storage device after being issued, or during an audit of the tool storage devices contents.

The kit audit function is invoked by the system administrator for specific objects defined as kits in the tool storage device. The objects defined as kits by the administrator contain sub components whose status cannot be determined by an automated tool control system. Examples of these sub components are hex screwdriver bits, easy-out tools, taps and dies, etc. Kits may also be in a container that interferes with the automated tool control system's capability to sense presence or absence. Kit components can also be objects too small for installation of an RFID chip, and are therefore included in a kit.

Figure 13:
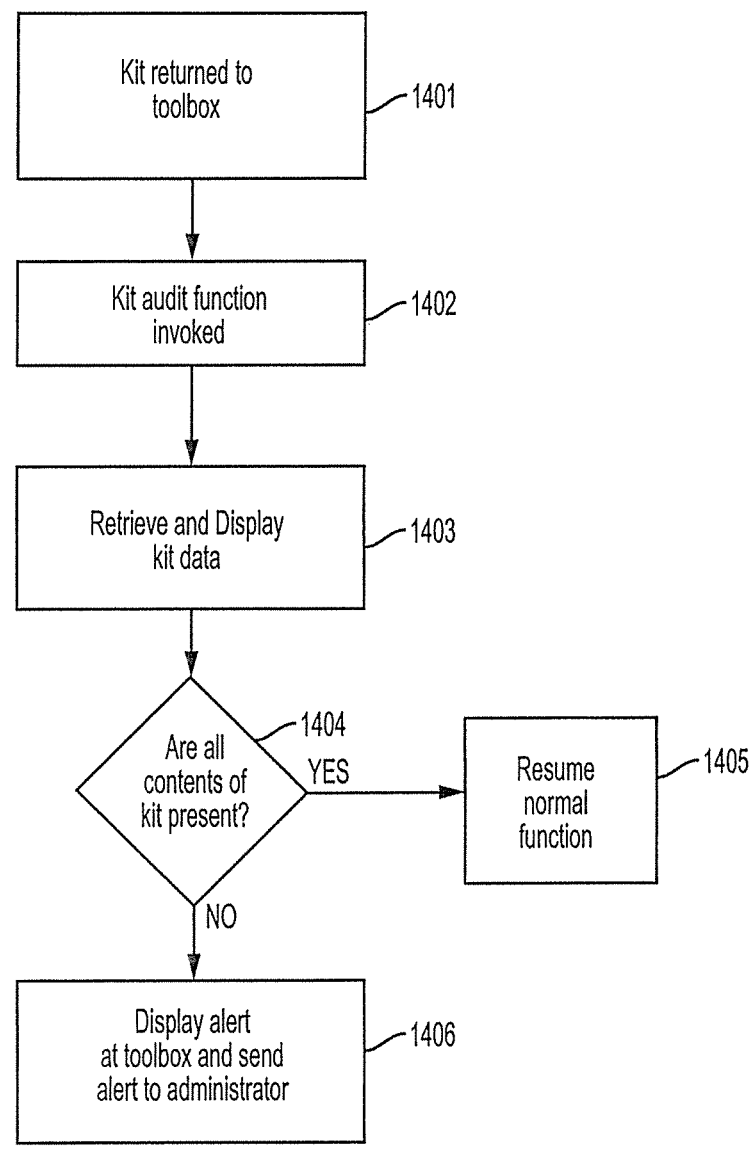
FIG. 13 is a flow chart illustrating a technique for auditing kit contents according to this disclosure.

Referring now to the flow chart of FIG. 13, when for example a kit is returned to the toolbox at step 1401, and the kit audit function is invoked on an object by the administrator of the system (step 1402), the program will locate a file stored in memory that contains an image of the contents of the kit, and/or a list of the contents of the kit, and display this data (step 1403). These files are displayed on the tool storage device's display apparatus when a kit is being returned after being issued, or during an audit of the specific drawer or tray, an audit of more than one but not all of the drawers or trays, or an audit of the completed set of drawers or trays in the tool storage device.

The files containing the data describing the contents of the kit can be obtained from various sources such as the following, without limitation:
 a photograph of the contents of the kit
 a link to a catalog image or listing
 a special function mode in the tool storage device which obtains an image of the selected kit's contents
 a CAD drawing of the kit
 a parts list When the files describing the contents of the kit are displayed, at least one user must confirm that all contents of the kit are present and provide this feedback to the system (step 1404). Feedback to the system may be through the use of a feedback button on the system's touch screen (e.g., display device 1020), an electromechanical button mounted on the tool storage device, or by other means.

Once the audit of the kit's contents is confirmed, the automated tool control system returns to normal operation (step 1405). If all the contents of the kit are not present, then an alert is displayed at the tool storage device and also sent to the administrator (step 1406). This alert contains information that the contents of the kit are incomplete and data regarding user, time, date, work location, work order, etc.

Lock Down of Selected Toolboxes for Auditing

According to this embodiment of the disclosure, an inventory control system for monitoring the removal and replacement of objects has at least one drawer or tray including storage locations for storing objects, and at least one sensing device configured to detect the presence or absence of objects in the storage locations. At least one administrative computer associated with the inventory control system is configured to provide commands over a network to the at least one tool storage device to remotely control the storage device locking mechanism.

In a normal work environment, the inventory contained in a tool storage device must be periodically audited. These audits can be scheduled to occur on a regular basis or can occur during a non-scheduled inspection. For example, in the aerospace world, audits are typically required at the end of each shift and prior to the release of the aircraft undergoing assembly, maintenance, or repair work.

A problem in current tool control environments is that there is no automated centralized control over the lock state of tool storage devices. An individual or group of individuals must inspect each tool storage device during an audit to insure they are locked, all inventory is accounted for, and that they remain locked until the work object (e.g., an aircraft) is certified to leave the area and the tool storage devices are released for use. This is an inefficient method of ensuring all tools or stored objects are accounted for.

According to this embodiment, the administrator of a tool control system has the capability to identify and change settings on an automated tool storage device (i.e., an automated tool box), such as the lock status of the individual tool storage devices. The implementation of this embodiment is shown in FIG. 10. An administrative computer 1040 associated with the inventory control system 1000 is configured to provide commands over a network 1050 to the inventory control system 1000 to remotely control the storage device locking mechanism (access control device 306), which is operatively connected to the local data processor to prevent access to the drawers 330 unless the proper credentials are presented. See also, FIG. 8 and the explanation thereof.

The administrator identifies a box or group of boxes to lock down, then activates a software program causing a lock down message to be transmitted from the administrator's computer 1040 to the computer on each individual or group of tool storage devices via the network 1050. The computer on each of the individual or group of tool boxes receives the message and closes its lock.

Following this lock down command distributed to the tool storage devices, the lock will not re-open until the administrator sends another command to unlock the boxes, or an authorized user or more than one authorized user present their credentials (i.e., scan their cards) and are allowed access. Allowing specific individuals access to a box in lockdown mode enables auditing of the contents of the toolbox.

The lock down mode is optionally set by the administrator to automatically occur at specific times during the working day, such as lunch time or end of shift. The lock down mode can also be set for a specific duration of time. The lock down mode is not necessarily associated with an audit. However, if lock down mode is associated with an audit, the system will automatically go into audit mode when a user with specific rights to access a box during lockdown and designated as the auditor opens the toolbox.

Multi-Factor Authentication for User Access in ATC Systems

According to this embodiment, an inventory control system for monitoring the removal and replacement of objects has at least one drawer or tray including storage locations for storing objects, and at least one sensing device configured to detect the presence or absence of objects in the storage locations. A data processor is configured to receive information representing user access rights and to allow or deny access by the user to the tool storage device based on the user's access rights. The data processor is further configured to require more than one means of user authentication in order for the user to gain access to the tool storage device.

It is desirable to limit access to an automated tool control system to authorized personnel to interact with the system inventory. A user's identity is authenticated prior to allowing access. Automated tool control systems in high security areas or containing high value contents require a corresponding higher level of security in the authentication process than is provided in conventional systems. Current automated tool control systems use a single method for user authentication before granting access to tools stored in the system. Authentication methods include electronic ID cards, typing a password or identification code, and biometric scans.

Such current authentication methods can be generalized into three categories: something a user has, something a user knows, and something a user is. Examples of "user has" authentication include an electronic ID badge or an encrypted USB flash drive. Examples of "user knows" authentication include typing in a password or numeric code, selecting a known image from a set of displayed images, answering a personal question, or swiping a predefined pattern on a touch screen. "User is" authentication typically involves biometrics, including fingerprint scans, retinal scans, or facial recognition.

Combining more than one category of authentication (multi-factor authentication) increases the security level of the authentication process. The failure or compromise of one level does not compromise the tool control system. An example of multi-factor authentication is requiring an electronic badge scan (user has) and entering a numeric code (user knows). Loss, theft, or duplication of the badge would not be enough to compromise system security.

According to this embodiment, an automated tool control system is programmed to require multi factor authentication as described above to gain access to the automated tool control systems tool storage devices. Referring again to FIG. 10, an inventory control system 1000 for monitoring the removal and replacement of objects stored in the system comprises a storage device including drawers 330 having a plurality of storage locations for storing objects, a sensing device (such as a camera) configured to detect the presence or absence of objects in the storage locations, an access control device 306, and a data processor operatively connected to the access control device 306 and the sensing device.

The data processor is configured to receive information representing user access rights and to allow or deny access by the user to the tool storage device based on the user's access rights, and is further configured to require that the information representing user access rights includes at least two types of user authentication to allow access to the tool storage device. As discussed above, the types of user authentication include something a user has, something a user knows, and a biometric factor of the user. In the example of FIG. 10, the data processor receives "user has" authentication via a card reader 306a, receives biometric information of the user via a fingerprint reader 306a, and receives "user knows" information via the touch screen display 1020. Of course, other conventional devices can be used to implement this embodiment.

Complex Filtering of Events in Data Log and Audit Images

According to this embodiment, an inventory control system for monitoring the removal and replacement of objects has at least one drawer or tray including storage locations for storing objects, and at least one image sensing device configured to form an image of the storage locations. A data processor is configured to receive information representing the image of the storage locations and data representing the usage of the objects associated with the image. The data processor is further configured to display audit images of the storage drawers or trays, and is also configured to apply complex filtering techniques to display the audit images according to user definable usage data fields associated with the audit images. The filtering technique comprises filtering out any object-specific events for objects other than an object of interest, and filtering out any container-specific events for containers other than a container of interest.

Automated tool control systems store event data and call up that data for review. Such log event data may include employee name, employee number, date, time, action, tool name, tool number, box name, box ID, drawer or tray, parent location, child location, and other pertinent data fields known to those of skill in the art.

Simple, or naïve, manual filtering provides only basic logic for field choices, and limits the events contained in the log files or audit images to be displayed to the user. Disadvantageously, not all relevant events can be displayed using manually selected field choices.

Each event that is generated in the system is tagged with an appropriate set of source identification numbers that allow unique identification of the item involved in the event. Thus, if a tool was issued from a toolbox to an employee, there would be a "TOOL ISSUED" event logged, with a number identifying the box, tool, drawer, and employee. If a box level event occurred (e.g., "BOX STARTUP"), then there would be a box identification logged, but no tool and employee identification values, since there are no tools or employees associated with that event. If a user wishes to filter the list of all events in the system, they could specify a target box, tool, employee, drawer, event type, drawer, time range, etc.

In this embodiment, complex filter logic is automatically applied to the log file data and/or stored images, and all relevant data related to a single event occurrence is presented chronologically on the tool control system's display. The filter logic is to first filter out any events that did not occur on the toolbox of interest ("the target toolbox"), then filter out any tool-specific events for tools other than the tool of interest ("the target tool") and filter out any drawer-specific events for drawers other than the drawer of interest ("the target drawer"). The list of filtered events is displayed to the user.

The logic of the automated complex filtering in this embodiment can be expressed in the following manner:
If (target_toolbox_match AND [target_tool_match OR {(not_a_tool_event AND target_drawer_match} OR {not_a_drawer_event AND not_a_tool_event}]) THEN display_event In the above expression, "target_toolbox_match" indicates that the box ID recorded for an event matches the desired box ID from the filter, and "target_tool_match" indicates that the tool ID recorded for an event matches the desired tool ID from the filter. "Not_a_tool_event" means the event did not target a specific tool (e.g., the event is a drawer open). This could be determined by checking for an empty tool ID field, or by comparing the event type to a list the defines "not a tool event." "Target_drawer_match" indicates that the drawer ID recorded for an event matches the desired drawer ID from the filter. "Not_a_drawer_event" indicates the event did not target a specific drawer (e.g., the event is a hardware failure on the toolbox). This could be determined by checking for an empty drawer ID field or by comparing the event type to a list that defines "not a drawer event." "Display_event" indicates that the event is shown in the filtered list.

Figure 14:
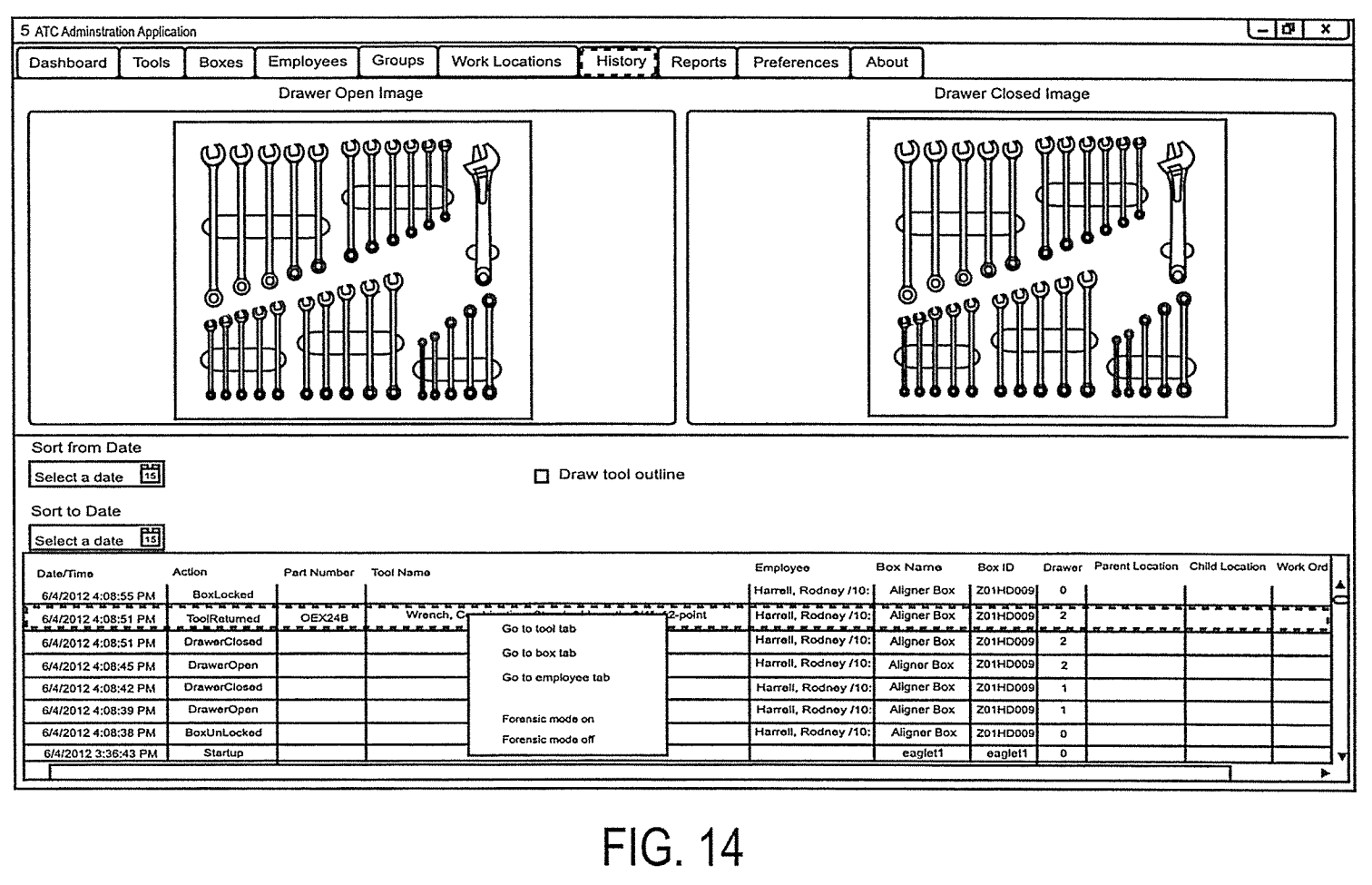
Figure 15:
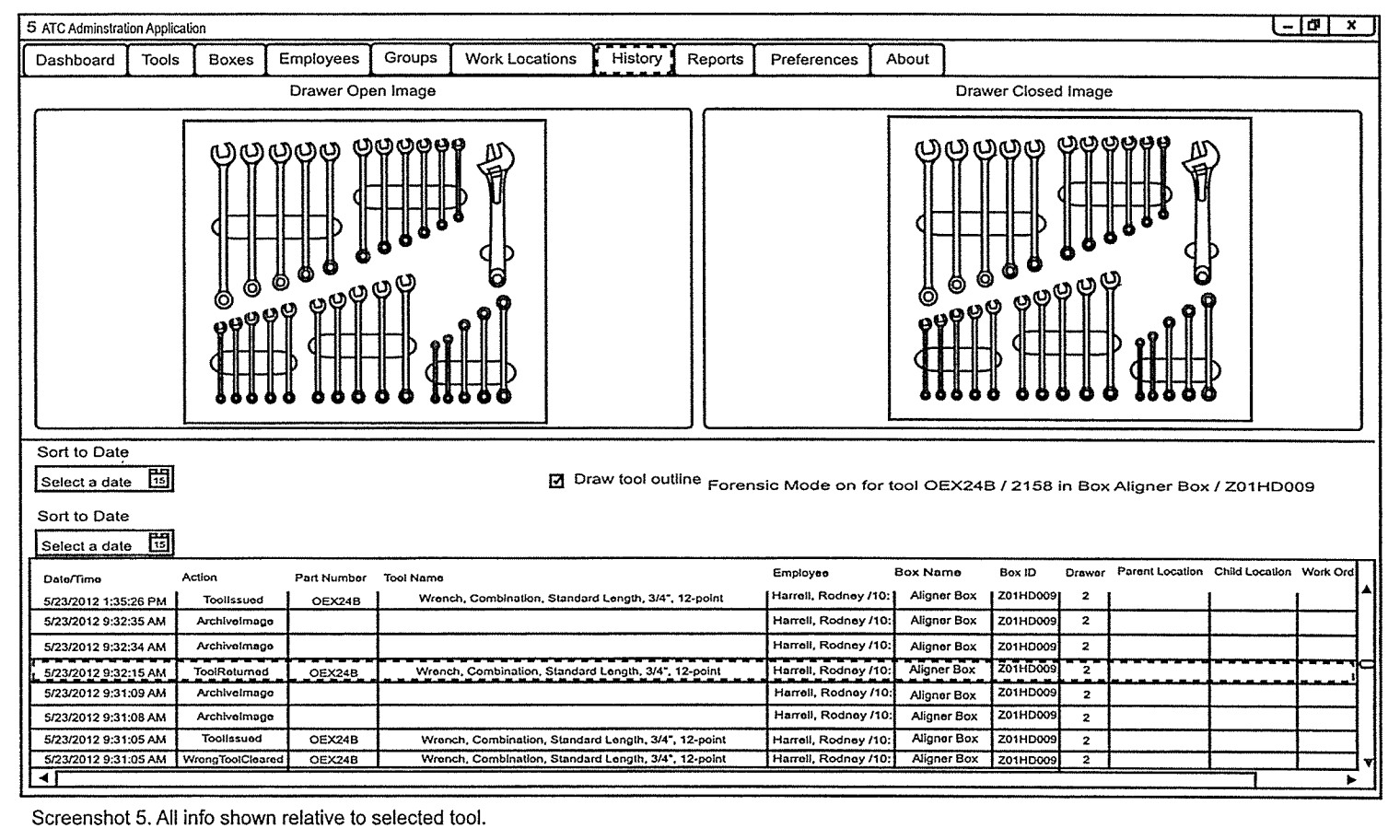

To activate this embodiment in an automated tool control system, the user right clicks on a listed tool event shown in a table on the display screen. A pop-up box appears on the screen with a choice of "Forensics On" or "Forensics Off" as shown in FIG. 14. When "Forensics On" is chosen, the ATC invokes the complex filtering algorithms and applies them to the available data. The box then displays tool level events if they match the target tool, drawer or tray level events if they match the target drawer or tray, and box level events (see FIG. 15).

The events described above are displayed in chronological order. The displayed events are individually searchable and can include, but are not limited to, the following:
Date/Time
Action
Part Number
Tool Name
Employee
Box Name
Box ID
Drawer or tray
Parent Location
Child Location The benefit of this embodiment is that in two button clicks, the user has all relevant data related to a tool event displayed, rather than having to manually manipulate filters or fields to research the same data. For example, if at the end of a shift during a scheduled toolbox audit, tool "Pick, Radiator Hose, Soft Grip, 10.30" is missing from drawer or tray 3 in the box named "Mechanical Lab," the administrator user right clicks on the issued tool line item displayed on the screen for tool "Pick, Radiator Hose, Soft Grip, 10.30". The Forensics on/Forensics off pop-up block appears and the user checks Forensics on (see FIG. 14).

The screen then displays all relevant and related events for Tool Box "Mechanical Lab," drawer 3, tool "Pick, Radiator Hose, Soft Grip, 10.30". The user can then quickly and easily search the displayed data, determine when the last time the tool was recognized as present, determine the last issue and to whom it was issued.

The same process is applied to other situations, such as incorrectly issued tools, wrong tools, user accesses, tool issue and any combination of the items listed above.

Simultaneous Zoom and Pan for Two Sequential Images

According to this embodiment, an inventory control system for monitoring the removal and replacement of objects has at least one drawer or tray including storage locations for storing objects, at least one image sensing device configured to form an image of the storage locations, and a display device. A data processor is configured to receive information representing images of the storage locations, and is further configured to display a plurality of images of the storage locations simultaneously on the display. The data processor is also configured to link the plurality of images to allow simultaneous zoom and pan of the images.

In this embodiment, the automated tool storage device administration computer displays at least one image of the storage device drawers or trays, which images are created as the drawers or trays are opened or closed. Individual images of a section of each drawer or tray layer are obtained and sewn together by a computer program run on each camera, as explained herein above with reference to FIG. 4D. These images are uploaded to the computer (data processor) residing on the individual tool storage device. The data processor combines the images from the cameras to produce a complete image of the entire scanned area of the drawer or tray (see, e.g., FIGS. 15 and 16). This complete drawer or tray image is sent to the administrator's computer via a network and stored in memory or in a network database where it is then available to the administrator.

The administrator can call up individual image files containing an open or closed scanned drawer or tray image, or the administrator can call up more than one full drawer or tray image. These images are associated with open or closed scans and can be sequential in time. The administrator cannot call up a plurality of non-sequential images to be displayed side by side; the images must be sequential.

If an administrator calls up more than one sequential image of the same drawer or tray, one on the open scan and one on the closed scan, they are then able to compare the images for differences. This embodiment enables the two simultaneously displayed sequential images of the same drawer or tray to be linked together so that they pan and zoom together. This provides ease of use.

Those of ordinary skill in the art will appreciate that pan & zoom features are commonplace in software that displays images, and will therefore understand how to implement this embodiment. A typical implementation captures a "mouse down" event from the user interface and calculates a transform that translates the displayed image's horizontal and vertical offset based on subsequent mouse movement (pan). Mouse wheel scroll events are captured and used to apply a scale transform to the displayed image (zoom). Other user interface features (scroll bars, buttons, etc.) may be used for the same purpose. The administrator software captures user pan & zoom interface requests for either of two simultaneously displayed images, and applies a transform equally to both displayed images.

Figure 16:
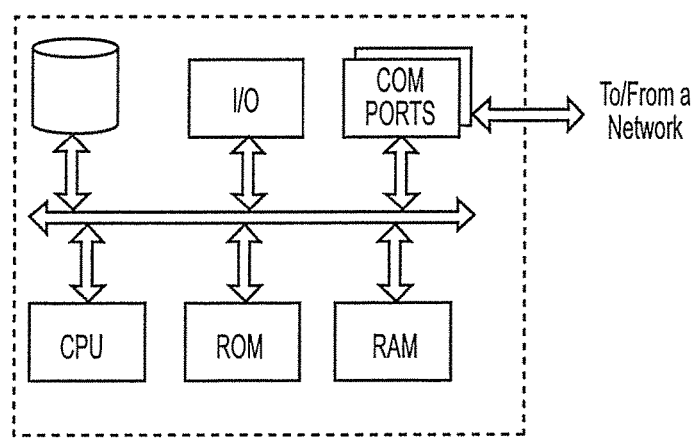
FIGS. 16 and 17 illustrate functional block diagram illustrations of general purpose computer hardware platforms.
Figure 17:
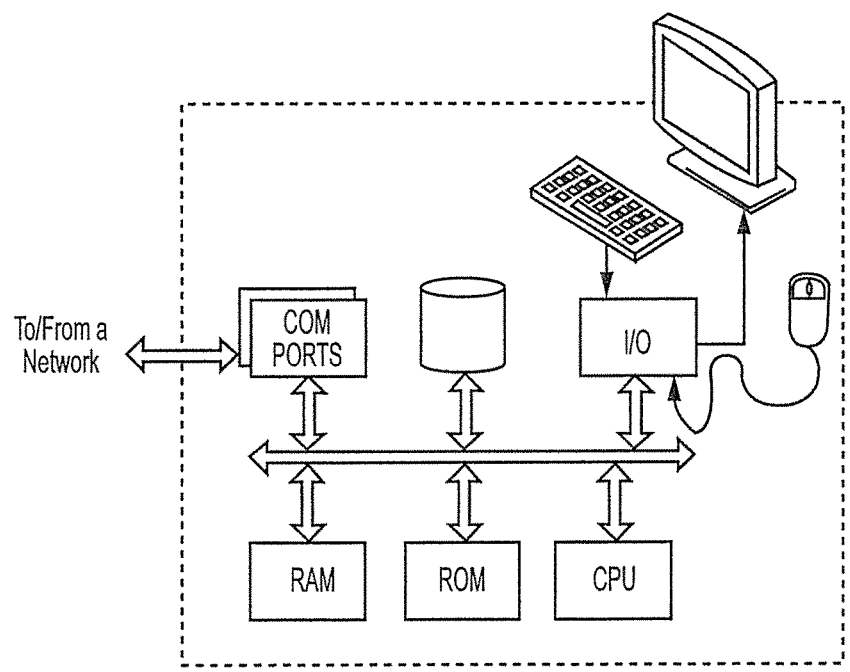

FIGS. 16 and 17 provide functional block diagram illustrations of general purpose computer hardware platforms. FIG. 16 illustrates a network or host computer platform, as may typically be used to implement a server. FIG. 17 depicts a computer with user interface elements, as may be used to implement a personal computer or other type of work station or terminal device, although the computer of FIG. 17 may also act as a server if appropriately programmed. It is believed that the general structure and general operation of such equipment as shown in FIGS. 16 and 17 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device (e.g., the inventory control system) similarly includes a data communication interface CPU, main memory and one or more mass storage devices for storing user data and the various executable programs (see FIG. 17). The various types of inventory control systems will also include various user input and output elements. For example, the inventory control system may include a keyboard and a cursor control/selection device such as a mouse, trackball, joystick or touchpad; and a display for visual outputs. A microphone and speaker enable audio input and output. Some other inventory control systems include similar but smaller input and output elements. The inventory control system may utilize touch sensitive display screens, instead of separate keyboard and cursor control elements. The hardware elements, operating systems and programming languages of such user terminal devices also are conventional in nature.

Hence, aspects of the methods of monitoring removal and replacement of tools within an inventory control system outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from the server 802 to the inventory control system. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the monitoring removal and replacement of tools within an inventory control system, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present teachings. However, it should be recognized that the present teachings can be practiced without resorting to the details specifically set forth. In other instances, well known processing structures have not been described in detail, in order not to unnecessarily obscure aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. An inventory control system for monitoring the removal and replacement of objects stored in the system, the system comprising:

a storage container including a plurality of storage locations for storing objects;
a sensing device configured to detect the presence or absence of objects in the storage locations;
a display device; and
a data processor configured to:
receive work order data identifying a particular work order;
receive information associated with the work order based on the work order data, wherein the information associated with the work order includes a list of work to be performed for the work order; and
display the work to be performed on the display device.

2. The inventory control system of claim 1, further comprising a barcode reader operatively connected to the data processor, for reading a barcode of the work order;
wherein the barcode of the work order includes the work order data.

3. The inventory control system of claim 1, further comprising a manual data entry device operatively connected to the data processor, for enabling a user to manually enter the work order data.

4. The inventory control system of claim 1, wherein the information associated with the work order includes at least one of a tool list, work instructions, an inspection form, a drawing, a photograph, and technical specifications.

5. The inventory control system of claim 4, further comprising a user display device wirelessly connected to the data processor, wherein the data processor is configured to transfer the information associated with the work order to the user display device.

6. The inventory control system of claim 1, further comprising a data storage device operatively connected to the data processor;
wherein the information associated with the work order is stored in the storage device.

7. The inventory control system of claim 1, further comprising a network communications device operatively connected to the data processor and to a remote database;
wherein the information associated with the work order is stored in the remote database.

8. The inventory control system of claim 1, wherein the display device is a touch screen for displaying a graphical display, and
wherein the data processor is configured to:
generate the graphical display such that a user selects a work task by touching a portion of the graphical display; and
receive the work order data based on the user's selection.

9. The inventory control system of claim 1, wherein the data processor is configured to associate a user with the work order and at least one of the objects stored in the system that has been removed from the system.

10. The inventory control system of claim 9, further comprising a manual data entry device operatively connected to the data processor, for enabling the user to manually enter information;
wherein the data processor is configured to associate the information entered by the user with the work order.

11. The inventory control system of claim 1, wherein the data processor is configured to associate a specific work location with the work order, and to display the work location on the display device.

12. The inventory control system of claim 1, further comprising a manual data entry device operatively connected to the data processor, for enabling the user to manually enter information;
wherein the information associated with the work order comprises a document requiring feedback from a user, and the data processor is configured to receive the document after it has been filled out by the user with the manual data entry device.

13. The inventory control system of claim 1, wherein the objects stored in the system comprise tools, the storage container comprises a plurality of drawers or trays, the information associated with the work order includes a tool list, and the data processor is configured to:
cause the display device to display the tool list;
determine whether each of the tools on the tool list is present in one of the drawers or trays;
cause the display device to display alternative tool locations for each of the tools that is not present;
cause the display device to display information relating to which of the drawers or trays contains each of the tools that are present.

14. The inventory system of claim 13, wherein the data processor is configured to cause the display device to display, responsive to a user opening one of the drawers or trays containing one of the tools on the tool list, at least one of an image of a layout of the drawer or tray with the tool highlighted, an image of the tool, and information relating to the tool.

15. The inventory system of claim 13, wherein the data processor is configured to cause the display device to display a list of users and locations for each of the tools that is not present.

16. An inventory control system for monitoring the removal and replacement of objects stored in the system, the system comprising:
a storage container including a plurality of storage locations for storing objects, wherein the objects include a kit having a plurality of sub-components;
a sensing device configured to detect the presence or absence of the objects kit at one of in the storage locations;
a display device; and
a data processor configured to:
receive a listing of the sub-components and an image of the kit, and
display the listing of the sub-components and the image of the kit on the display device when the sensing device detects the presence of the kit at one of the storage locations after it has detected the absence of the kit at the one of the storage locations;
whereby an operator of the system can manually audit the sub-components of the kit when a presence or absence of the respective sub-components cannot be determined by the sensing device.

17. The inventory control system of claim 16, wherein the processor is configured to:
prompt a user to confirm all the sub-components of the kit are present; and
display an alert on the display device, and transmit the alert to an operator of the system, when the user does not confirm all the sub-components of the kit are present.

18. An inventory control system for monitoring the removal and replacement of objects stored in the system, the system comprising:
a storage device including a container having a plurality of storage locations for storing objects, a sensing device configured to detect the presence or absence of objects in the storage locations, a locking mechanism for preventing access to the storage locations, and a data processor operatively connected to the locking mechanism and the sensing device; and an administrative computer remote from the storage device and operatively connected to the data processor, the administrative computer configured to provide commands to the data processor to remotely control the storage device locking mechanism.

19. The inventory control system of claim 18, wherein the administrative computer is configured to activate the locking mechanism, and to prevent deactivation of the locking mechanism until it sends a command to unlock the boxes, or an authorized user or more than one authorized user present their credentials to the locking mechanism.

20. The inventory control system of claim 18, wherein the data processor is configured to:

receive information representing user access rights and to allow or deny access by the user to the tool storage device based on the user's access rights;

wherein the data processor is further configured to require that the information representing user access rights includes at least two types of user authentication to allow access to the tool storage device.

21. The inventory control system of claim 20, wherein the types of user authentication include something a user has, something a user knows, and a biometric factor of the user.

22. An inventory control system for monitoring the removal and replacement of objects stored in the system, the system comprising:

a plurality of storage containers, each including a plurality of storage locations for storing objects;

an image sensing device configured to capture image data of the containers, including image data of the plurality of storage locations;

a display device; and a data processor configured to:

receive information representing captured images of the storage locations and data representing the usage of the objects associated with the images;

display on the display device audit images of the storage container; and apply a filtering technique to display the audit images according to user definable usage data fields associated with the audit images;

wherein the filtering technique is for selecting audit images associated with one event out of a plurality of events occurring in the system, and the filtering technique comprises filtering out any object-specific events for objects other than an object of interest, and filtering out any container-specific events for containers other than a container of interest.

23. An inventory control system for monitoring the removal and replacement of objects stored in the system, the system comprising:

a storage container including a plurality of storage locations for storing objects;

an image sensing device configured to capture image data of the container, including image data of the plurality of storage locations;

a display device; and a data processor configured to:

receive information representing images of the storage locations, display a plurality of images of at least one of the storage locations captured at different times simultaneously on the display, and link the plurality of images to allow simultaneous zoom and pan of the images.

* * * * *